United States Patent
Oi et al.

(10) Patent No.: US 8,933,966 B2
(45) Date of Patent: Jan. 13, 2015

(54) IMAGE PROCESSING DEVICE, IMAGE PROCESSING METHOD AND PROGRAM

(75) Inventors: Kenichiro Oi, Kanagawa (JP); Jingjing Guo, Tokyo (JP); Yasuhiro Suto, Tokyo (JP)

(73) Assignee: Sony Corporation, Tokyo (JP)

( * ) Notice: Subject to any disclaimer, the term of this patent is extended or adjusted under 35 U.S.C. 154(b) by 287 days.

(21) Appl. No.: 12/879,536

(22) Filed: Sep. 10, 2010

(65) Prior Publication Data

US 2011/0096093 A1 Apr. 28, 2011

(30) Foreign Application Priority Data

Oct. 27, 2009 (JP) ................................. 2009-246090

(51) Int. Cl.
   *G09G 5/00* (2006.01)
   *G06T 19/00* (2011.01)
   *G06T 7/00* (2006.01)

(52) U.S. Cl.
   CPC .............. *G06T 19/006* (2013.01); *G06T 7/0044* (2013.01); *G06T 2207/20164* (2013.01)
   USPC ........................................................ 345/633

(58) Field of Classification Search
   None
   See application file for complete search history.

(56) References Cited

U.S. PATENT DOCUMENTS

| 2002/0140709 A1* | 10/2002 | Sauer et al. | 345/633 |
| 2003/0146922 A1* | 8/2003 | Navab et al. | 345/633 |
| 2010/0208033 A1* | 8/2010 | Edge et al. | 348/46 |

FOREIGN PATENT DOCUMENTS

JP 2008-304268 12/2008

OTHER PUBLICATIONS

Davison, A.J, "Real-time simultaneous localisation and mapping with a single camera", 2003, IEEE.*
Zokai et al., "Multiview Paraperspective Projection Model for Diminished Reality", 2003, IEEE.*
Andrew J. Davison, "Real-Time Simultaneous Localisation and Mapping with a Single Camera", Proceedings of the 9$^{th}$ IEEE International Conference on Computer Vision, vol. 2, 2003, 8 pages.

* cited by examiner

*Primary Examiner* — David H Chu
(74) *Attorney, Agent, or Firm* — Oblon, Spivak, McClelland, Maier & Neustadt, L.L.P.

(57) ABSTRACT

There is provided an image processing device, including: a data storage unit storing feature data indicating a feature of appearance of an object; an environment map generating unit for generating an environment map representing a position of one or more objects existing in a real space based on an input image obtained by imaging the real space using an imaging device and the feature data stored in the data storage unit; and an output image generating unit for generating an output image obtained by erasing an erasing target object from the input image based on a position of the erasing target object specified out of objects present in the input image represented in the environment map and a position of the imaging device.

12 Claims, 26 Drawing Sheets

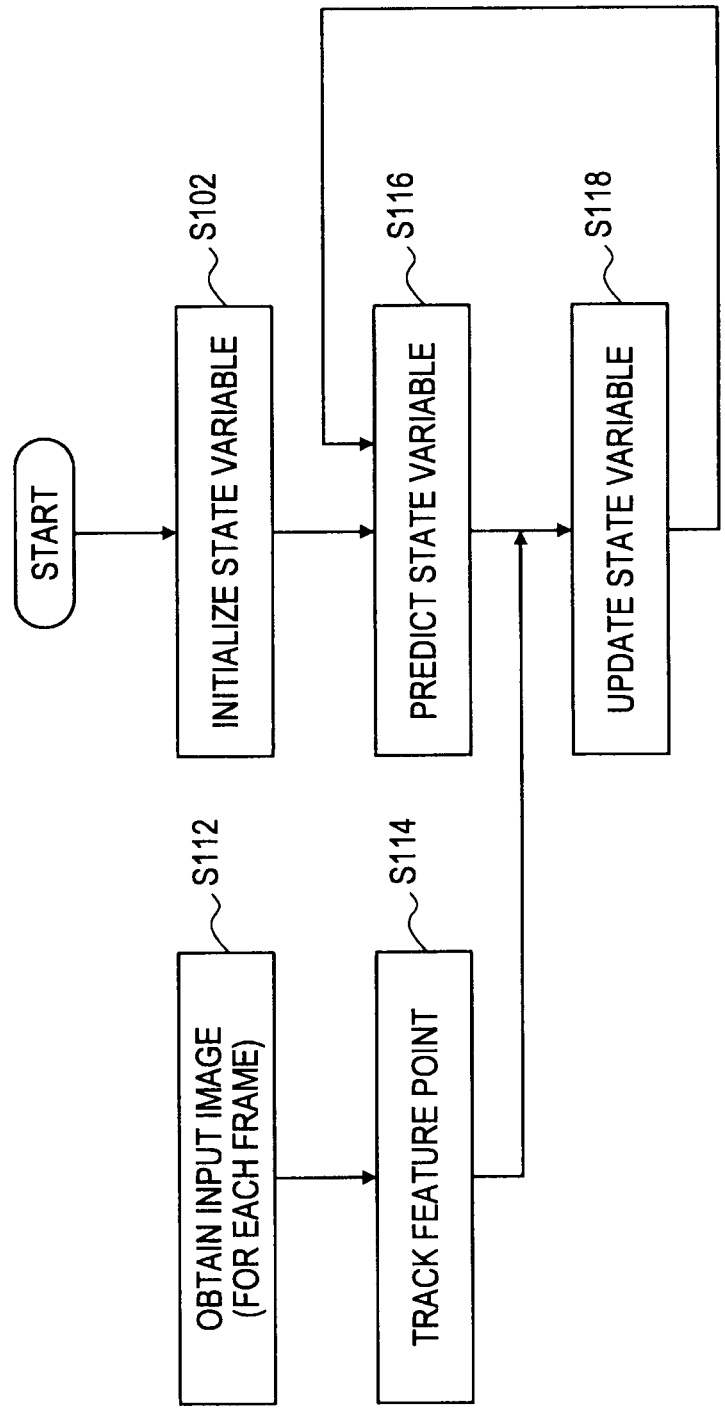

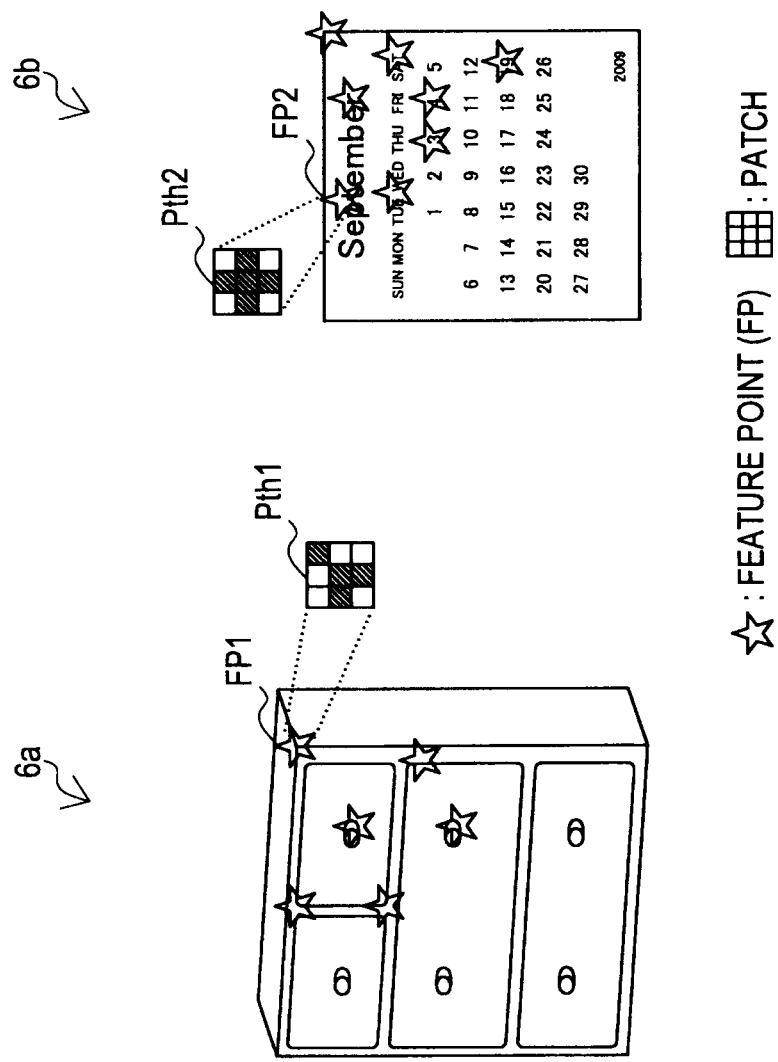

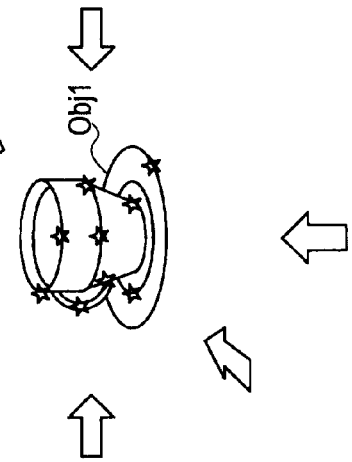
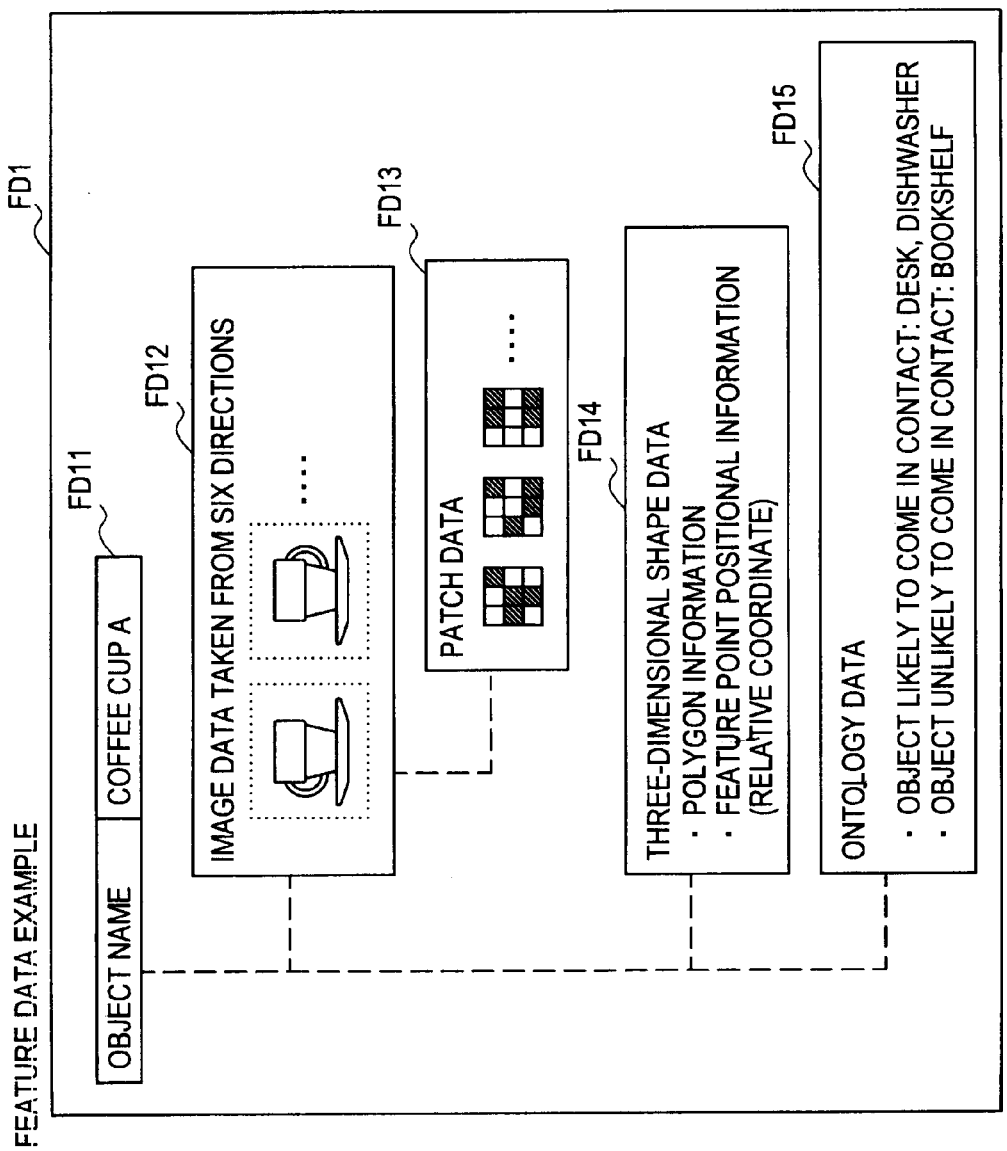
FIG.9

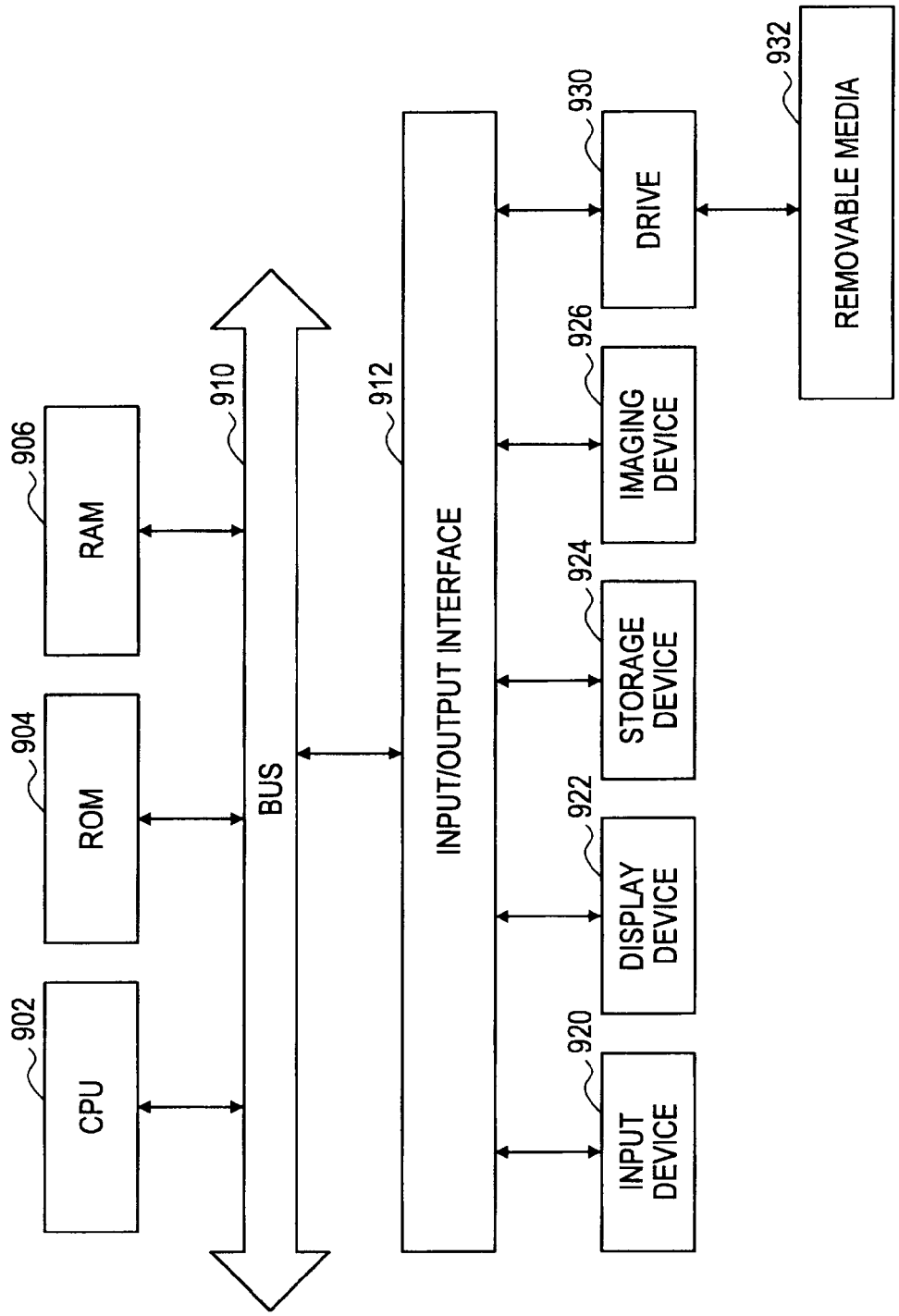

IMAGE PROCESSING DEVICE, IMAGE PROCESSING METHOD AND PROGRAM

FIELD OF THE INVENTION

The present invention relates to an image processing device, an image processing method and a program.

DESCRIPTION OF THE RELATED ART

Recently, technology referred to as augmented reality (AR) receives attention whereby an image obtained by imaging a real space and modified through a specific process is presented to a user. In the AR technology, useful information related to an object in a real space shown in an input image may be inserted into the image to be output as an output image, for example. That is, in the AR technology, typically, a large part of the image presented to the user shows the real space, and some part of the image may be processed in accordance with an application purpose. Such a characteristic is in contrast to virtual reality in which an entire (or a large part) of the output image is composed using computer graphics (CG). By using the AR technology, for example, advantages such as easy understanding of a situation of the real space by a user or work support based on the output image may be provided.

In the AR technology, in order to present really useful information to the user, it is important that a computer accurately understands the situation of the real space. Therefore, technology aimed to understand the situation of the real space, which serves as a basis of the AR technology, has been developed. For example, the following Japanese Patent Application Laid-Open No. 2008-304268 discloses a method of dynamically generating an environment map representing a three-dimensional positions of objects existing in a real space by applying technology referred to as simultaneous localization and mapping (SLAM) capable of simultaneously estimating a position and posture of a camera and a position of a feature point shown in an image of the camera. Meanwhile, a basic principle of the SLAM technology using a monocular camera is disclosed in "Real-Time Simultaneous Localization and Mapping with a Single Camera" (Andrew J. Davison, Proceedings of the 9th IEEE International Conference on Computer Vision Volume 2, 2003, pp. 1403-1410).

SUMMARY OF THE INVENTION

Conventionally, there is image processing technology to erase a specified object out of the objects shown in the image to make the object look like as if this does not exist. In such technology, in general, a background image is taken in advance and the background image is shown in place of an area corresponding to a newly-entered human body or object instead. However, in such a method, it is required to take the background image each time the position or the posture of the camera changes. Also, it is not easy to move an outdoor building and indoor furniture, so that it is difficult to take the background image in a state in which there is no such object.

In this situation, it is considered to be advantageous to generate an image based on the above-mentioned environment map instead of taking the background image, so as to enable to erase even the object difficult to be moved from the image regardless of the position or the posture of the camera.

In light of foregoing, it is desirable to provide novel and improved image processing device, image processing method and program capable of erasing the specified object from the image without taking the background image in advance.

According to an embodiment of the present invention, there is provided an image processing device, including: a data storage unit storing feature data indicating a feature of appearance of an object; an environment map generating unit for generating an environment map representing a position of one or more objects existing in a real space based on an input image obtained by imaging the real space using an imaging device and the feature data stored in the data storage unit; and an output image generating unit for generating an output image obtained by erasing an erasing target object from the input image based on a position of the erasing target object specified out of objects present in the input image represented in the environment map and a position of the imaging device.

According to such a configuration, the environment map is dynamically generated based on the input image and feature data, and the output image obtained by erasing the erasing target object is generated based on the environment map.

The image processing device may further include: a detecting unit for dynamically detecting the position of the imaging device based on the input image and the feature data.

The output image generating unit may include: an erased area determining unit for determining an erased area being an area in the input image corresponding to the erasing target object based on the position of the erasing target object in the environment map and the position of the imaging device; a CG image generating unit for generating a CG image to be superimposed on the input image; and an image superimposing unit for generating the output image by superimposing the CG image generated by the CG image generating unit on the input image for at least a part of the erased area.

The CG image generating unit may generate the CG image based on a position of an object other than the erasing target object represented by the environment map and the position of the imaging device.

The output image generating unit may further include a position estimating unit for estimating a position of a floor surface or a wall surface in the real space based on a position of a point on a surface of the object represented by the environment map, and the CG image generating unit may generate the CG image further based on the position of the floor surface or the wall surface in the real space estimated by the position estimating unit.

The feature data may include data indicating, for one or more points on the surface of each object, whether each point is likely to come in contact with the floor surface or the wall surface in the real space, and the position estimating unit may estimate the position of the floor surface or the wall surface in the real space further based on the feature data.

The CG image generating unit may generate the CG image of a portion included in the erased area and the portion in which the floor surface or the wall surface in the real space should be shown according to an image of a portion in which the floor surface or the wall surface in the real space is estimated to be shown of the input image.

The image processing device may further include: a virtual object selecting unit for selecting an object to be virtually displayed in the output image, wherein the CG image generating unit may additionally arrange an object selected by the virtual object selecting unit in the CG image.

The object to be virtually displayed, corresponds to a specified object after being moved out of the objects present in the input image and the erasing target object corresponds to the specified object before being moved.

According to another embodiment of the present invention, there is provided an image processing method performed using an image processing device having a data storage unit storing feature data indicating a feature of appearance of an object, the method including steps of: generating an environment map representing a position of one or more objects existing in a real space based on an input image obtained by imaging the real space using an imaging device and the feature data stored in the data storage unit; and generating an output image obtained by erasing an erasing target object from the input image based on a position in the environment map of the erasing target object specified out of objects present in the input image and a position of the imaging device.

According to another embodiment of the present invention, there is provided a program for causing a computer for controlling an image processing device to function as: a data storage unit storing feature data indicating a feature of appearance of an object; an environment map generating unit for generating an environment map representing a position of one or more objects existing in a real space based on an input image obtained by imaging the real space using an imaging device and the feature data stored in the data storage unit; and an output image generating unit for generating an output image obtained by erasing an erasing target object from the input image based on a position of the erasing target object specified out of objects present in the input image in the environment map and a position of the imaging device.

As described above, according to the image processing device, the image processing method and the program according to an embodiment of the present invention, the specified object may be erased from the image without taking the background image in advance.

BRIEF DESCRIPTION OF THE DRAWINGS

FIG. 5 is a flowchart illustrating an example of flow of a self-position detection process according to the first embodiment;

FIG. 8 is an illustrative diagram for illustrating an example of a prediction model;

FIG. 9 is an illustrative diagram for illustrating an example of a configuration of feature data;

FIG. 26 is a block diagram illustrating an example of a hardware configuration of a general-purpose computer.

DETAILED DESCRIPTION OF THE EMBODIMENT(S)

Figure 1:
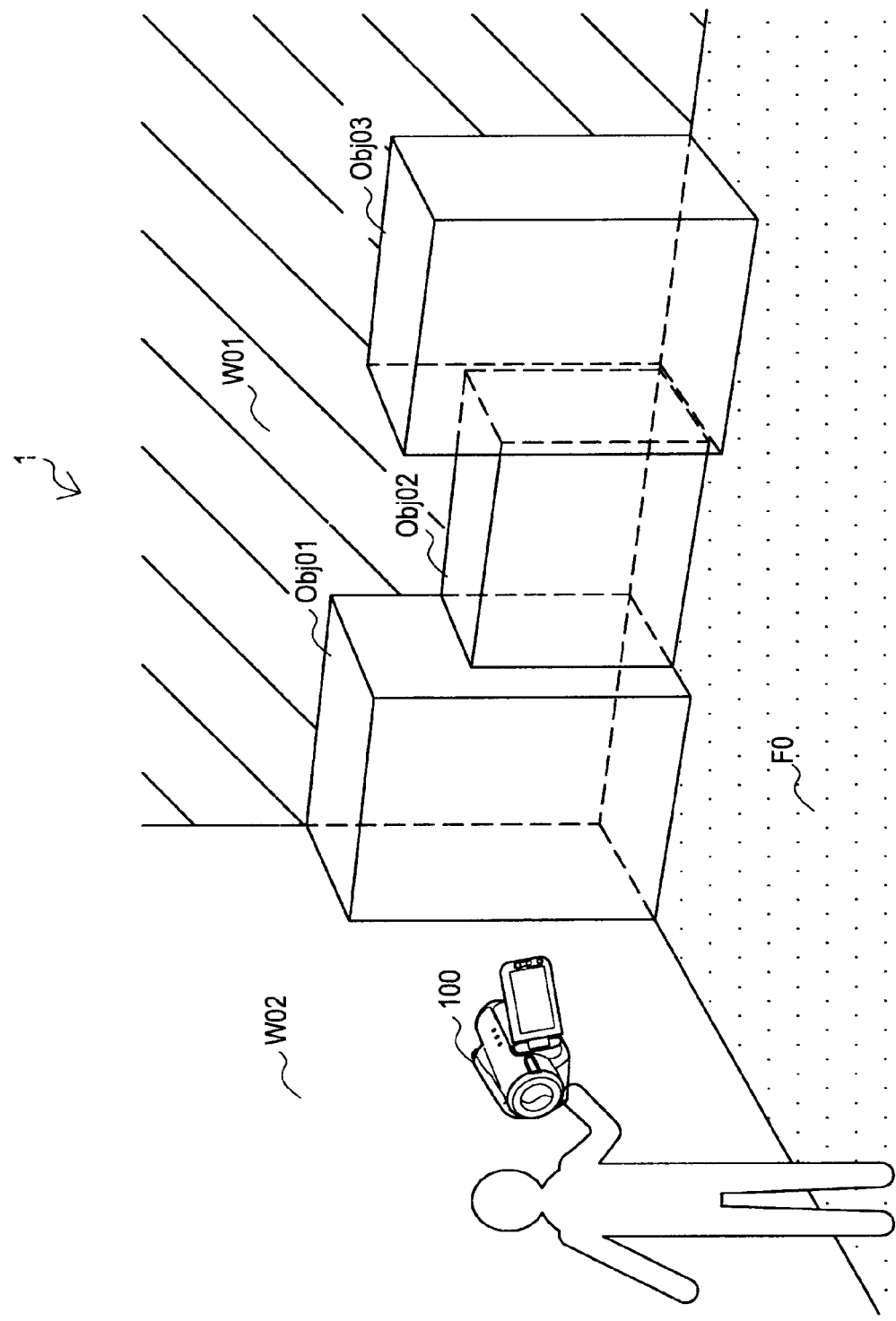
FIG. 1 is a schematic diagram for illustrating an image processing device according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Also, the "detailed description of the embodiment(s)" is described in a following order.

1. Overview of Image Processing Device According to an Embodiment.
2. First Embodiment
2-1. Imaging Unit
2-2. Environment Map Generating Unit
2-3. Output Image Generating Unit
2-4. Summary of First Embodiment
3. Second Embodiment
3-1. Environment Map Generating Unit
3-2. Output Image Generating Unit
3-3. Summary of Second Embodiment
4. Third Embodiment
4-1. Output Image Generating Unit
4-2. Summary of Third Embodiment
5. Hardware Configuration 1. Overview of Image Processing Device According to an Embodiment FIG. 1 is a schematic diagram for illustrating an image processing device according to an embodiment of the present invention. FIG. 1 illustrates an environment 1 according to an embodiment of the present invention in which a user having an image processing device 100 is present.

With reference to FIG. 1, there are three objects Obj01, Obj02 and Obj03, wall surfaces W01 and W02 and a floor surface F0 inside the environment 1. The object Obj01 is arranged on a corner between the wall surfaces W01 and W02. Further, the object Obj02 is arranged next to the object Obj01 and the object Obj03 is arranged next to the object Obj02 along the wall surface W01. In a case in which the environment 1 is a room of a house, the objects Obj01, Obj02 and Obj03 correspond to pieces of furniture such as a drawer, for example.

The image processing device 100 images inside the environment 1, which is a real space, and executes image processing according to this embodiment described later. Although a video camera is illustrated as an example of the image processing device 100 in FIG. 1, the image processing device 100 is not limited to such an example. For example, the image processing device 100 may be an information processing device such as a personal computer (PC), a mobile terminal or a digital household electrical appliance capable of obtaining an image from an imaging device such as the video camera. Also, the image processing device 100 is not necessarily held by the user as illustrated in FIG. 1. For example, the image processing device 100 may be fixedly installed on an optional place or may be mounted on a robot and the like having a camera as eyesight. Further, the environment 1 is not limited to the example illustrated in FIG. 1, and may be an indoor environment or an outdoor environment.

Figure 2:
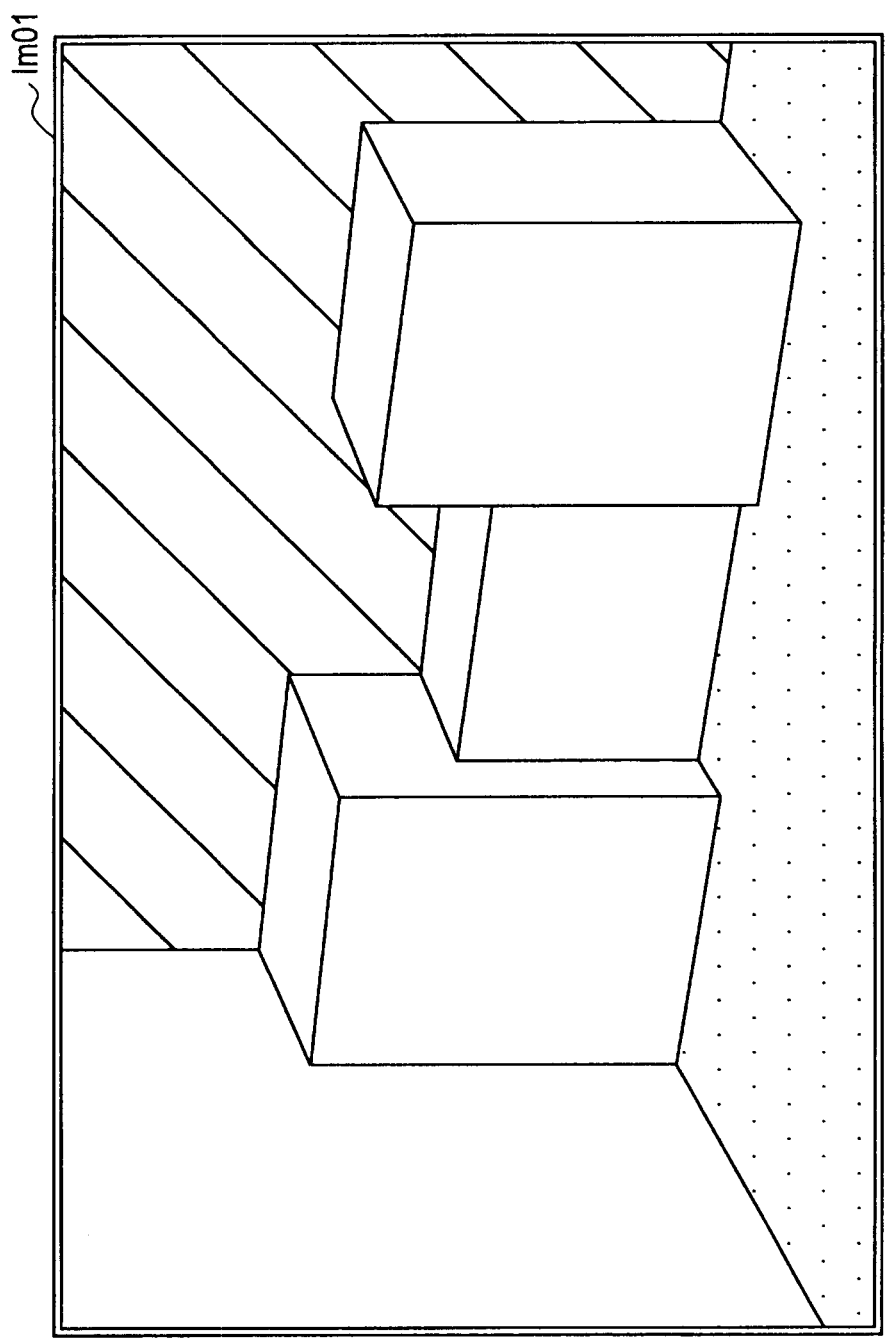
FIG. 2 is an illustrative diagram illustrating an example of an input image for image processing according to an embodiment.

FIG. 2 illustrates an input image Im01 as an example taken by the image processing device 100 in the environment 1 in FIG. 1. The three objects Obj01, Obj02 and Obj03, the wall surfaces W01 and W02 and the floor surface F0 illustrated in FIG. 1 are present in the input image Im01. The image processing device 100 obtains such input image, for example, and generates an output image obtained by erasing an erasing target object from the obtained input image. The erasing target object may be selected from the objects Obj01, Obj02 and Obj03 by the user, for example. Instead, the erasing target object may be specified by an optional application, for example.

Figure 3:
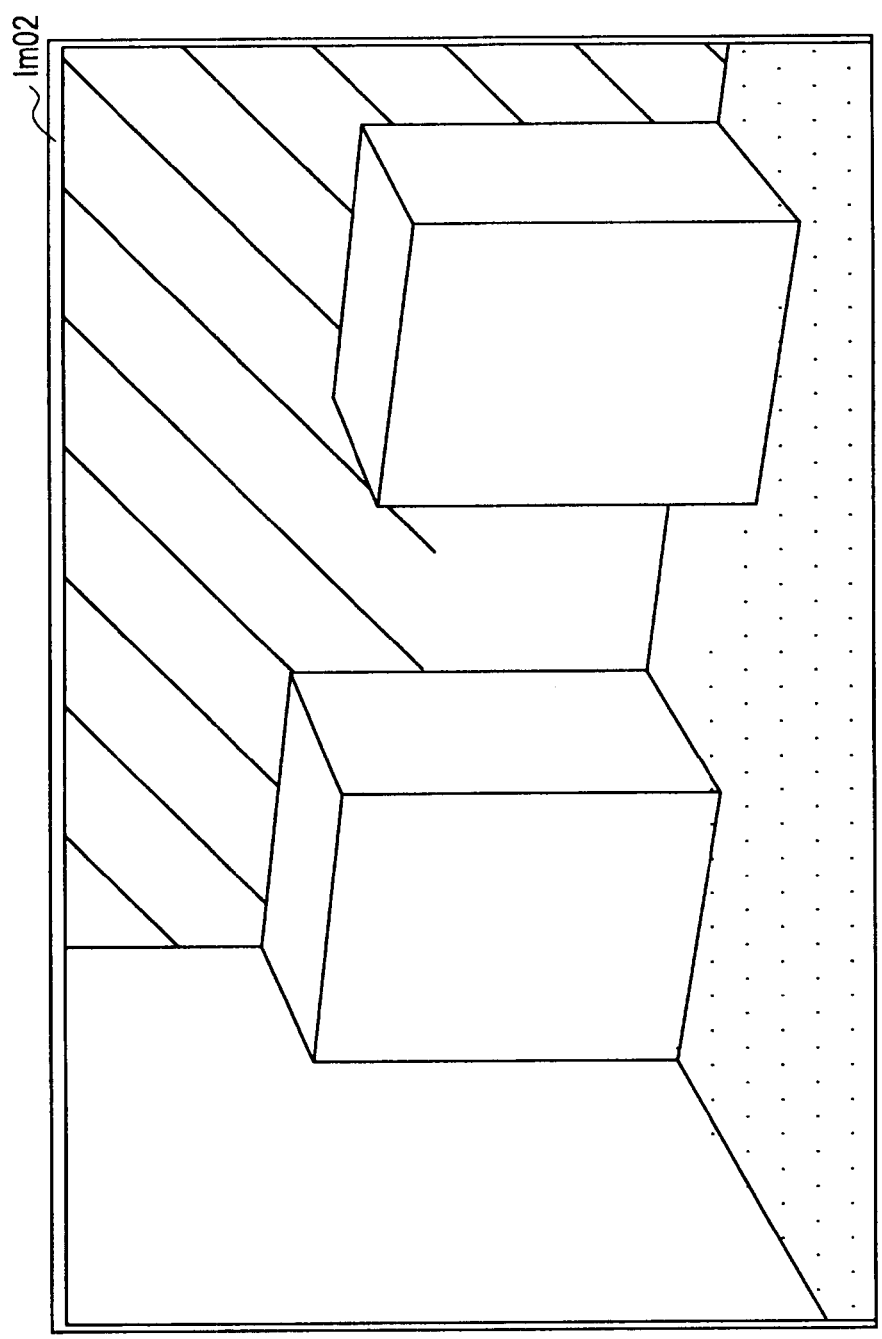
FIG. 3 is an illustrative diagram illustrating an example of an output image output as a result of the image processing according to an embodiment.

FIG. 3 illustrates an output image Im02 as an example output as a result of the image processing by the image processing device 100. The object Obj02 out of the objects present in the input image Im01 is not included in the output image Im02. Instead, a part of the object Obj01 and the like hidden behind the object Obj02 is shown in an area in which the object Obj02 is present in the input image Im01. In this specification, it is described in detail how the image processing device 100 generates such output image from the input image.

2. First Embodiment

Figure 4:
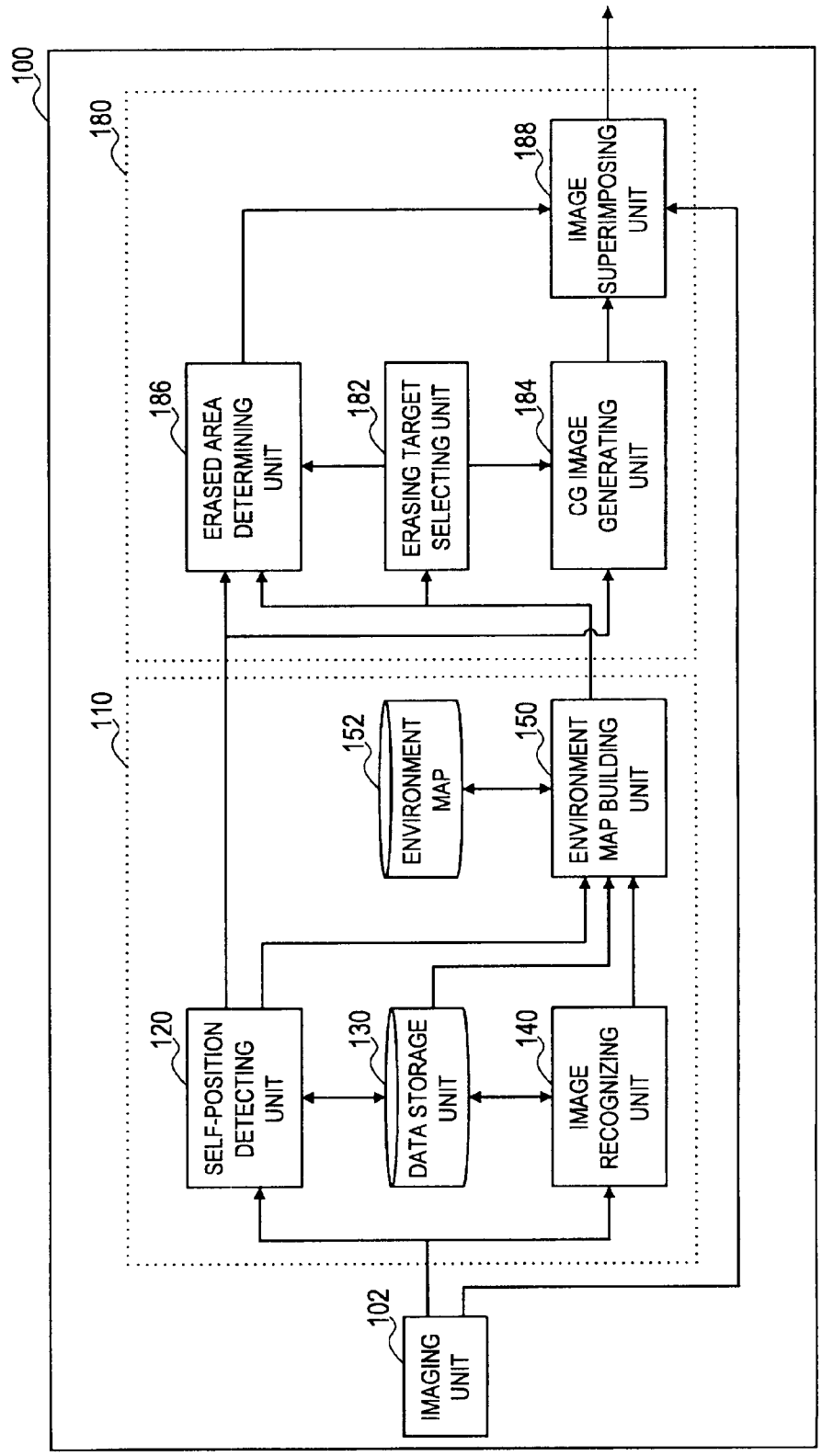
FIG. 4 is a block diagram illustrating an example of a configuration of an image processing device according to a first embodiment.

FIG. 4 is a block diagram illustrating an example of a configuration of the image processing device 100 according to the first embodiment. With reference to FIG. 4, the image processing device 100 includes an imaging unit 102, an environment map generating unit 110 and an output image generating unit 180.

[2-1. Imaging Unit]

The imaging unit 102 may be realized as an imaging device having an imaging element such as a charge coupled device (CCD) or a complementary metal oxide semiconductor (CMOS), for example. Although the imaging unit 102 is composed as a part of the image processing device 100 in this embodiment, the imaging unit 102 may be provided outside the image processing device 100. The imaging unit 102 outputs an image generated by imaging the real space such as the environment 1 illustrated in FIG. 1 to the environment map generating unit 110 and the output image generating unit 180 as the input image.

[2-2. Environment Map Generating Unit]

The environment map generating unit 110 generates an environment map, which represents positions of one or more objects present in the real space and the like based on the input image input from the imaging unit 102 and feature data of an object to be described later stored in a data storage unit 130. As illustrated in FIG. 4, in this embodiment, the environment map generating unit 110 includes a self-position detecting unit 120, the data storage unit 130, an image recognizing unit 140, an environment map building unit 150 and an environment map storage unit 152.

(1) Self-Position Detecting Unit

The self-position detecting unit 120 dynamically detects a position of the imaging device, which takes the input image, based on the input image input from the imaging unit 102 and the feature data stored in the data storage unit 130. For example, also in a case in which the imaging device has a monocular camera, the self-position detecting unit 120 may dynamically determine a position and posture of the camera and a position of a feature point on an imaging plane of the camera for each frame by applying the SLAM technology disclosed in the above-described "Real-Time Simultaneous Localization and Mapping with a Single Camera" (Andrew J. Davison, Proceedings of the 9th IEEE International Conference on Computer Vision Volume 2, 2003, pp. 1403-1410).

Figure 7:
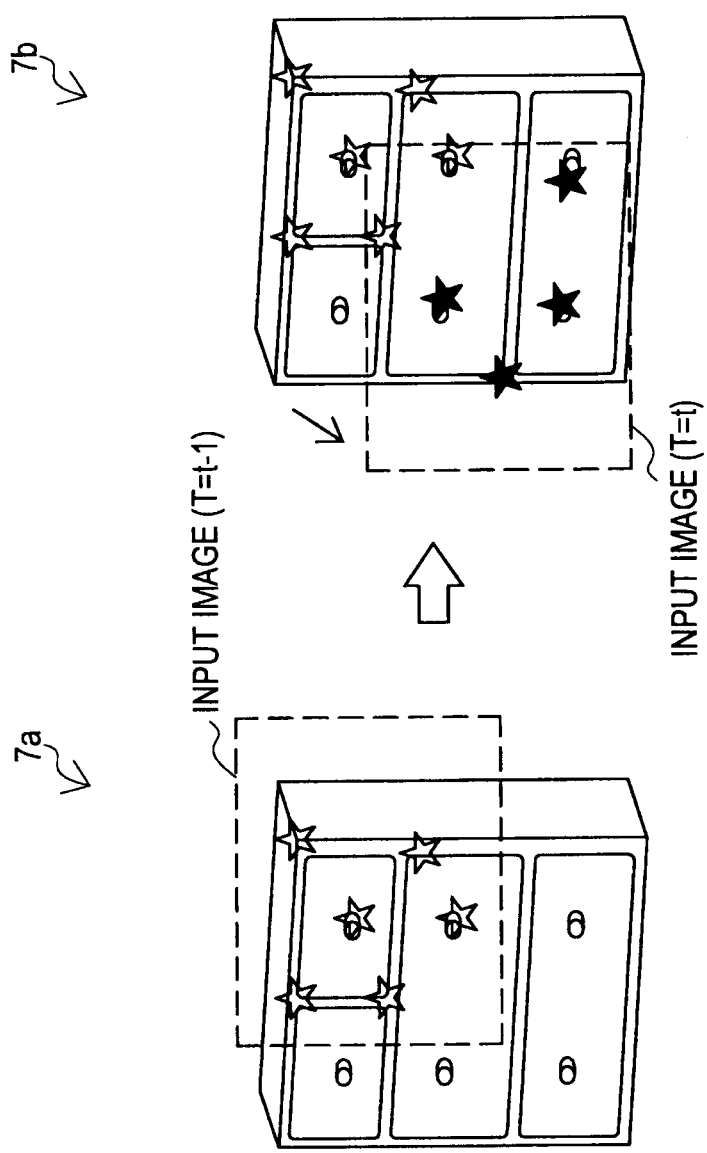
FIG. 7 is an illustrative diagram for illustrating addition of the feature point.

First, entire flow of a self-position detection process by the self-position detecting unit 120 to which the SLAM technology is applied is described with reference to FIG. 5. Next, the self-position detection process is described in detail with reference to FIGS. 6 to 8.

FIG. 5 is a flowchart illustrating an example of the flow of the self-position detection process by the self-position detecting unit 120 to which the SLAM technology is applied. In FIG. 5, when the self-position detection process starts, the self-position detecting unit 120 first initializes a state variable (step S102). In this embodiment, the state variable is a vector including the position and the posture (rotation angle) of the camera, a moving speed and an angular speed of the camera and the position of one or more feature points as an element. The self-position detecting unit 120 then sequentially obtains the input image from the imaging unit 102 (step S112). The processes from the step 112 to the step S118 may be repeated for each input image (that is, each frame).

At the step S114, the self-position detecting unit 120 tracks feature points present in the input image. For example, the self-position detecting unit 120 detects a patch (small image of 3×3=9 pixels around a feature point, for example) of each feature point stored in advance in the data storage unit 130 from the input image. The position of the patch herein detected, that is, the position of the feature point is used later when updating the state variable.

At the step S116, the self-position detecting unit 120 generates a predicted value of the state variable of next frame, for example, based on a predetermined prediction model. Also, at the step S118, the self-position detecting unit 120 updates the state variable using the predicted value of the state variable generated at the step S116 and an observed value according to the position of the feature point detected at the step S114. The self-position detecting unit 120 executes the processes at the steps S116 and S118 based on a principle of an extended Kalman filter.

As a result of such process, a value of the state variable updated for each frame is output. Configuration of each process of tracking of the feature point (step S114), prediction of the state variable (step S116) and updating of the state variable (step S118) are hereinafter described more specifically.

(1-1) Tracking of Feature Point

In this embodiment, the data storage unit 130 stores in advance the feature data indicating features of objects corresponding to physical objects which may be present in the real space. The feature data includes small images, that is, the patches regarding one or more feature points, each representing the feature of appearance of each object, for example. The patch may be the small image composed of 3×3=9 pixels around the feature point, for example.

Figure 6:
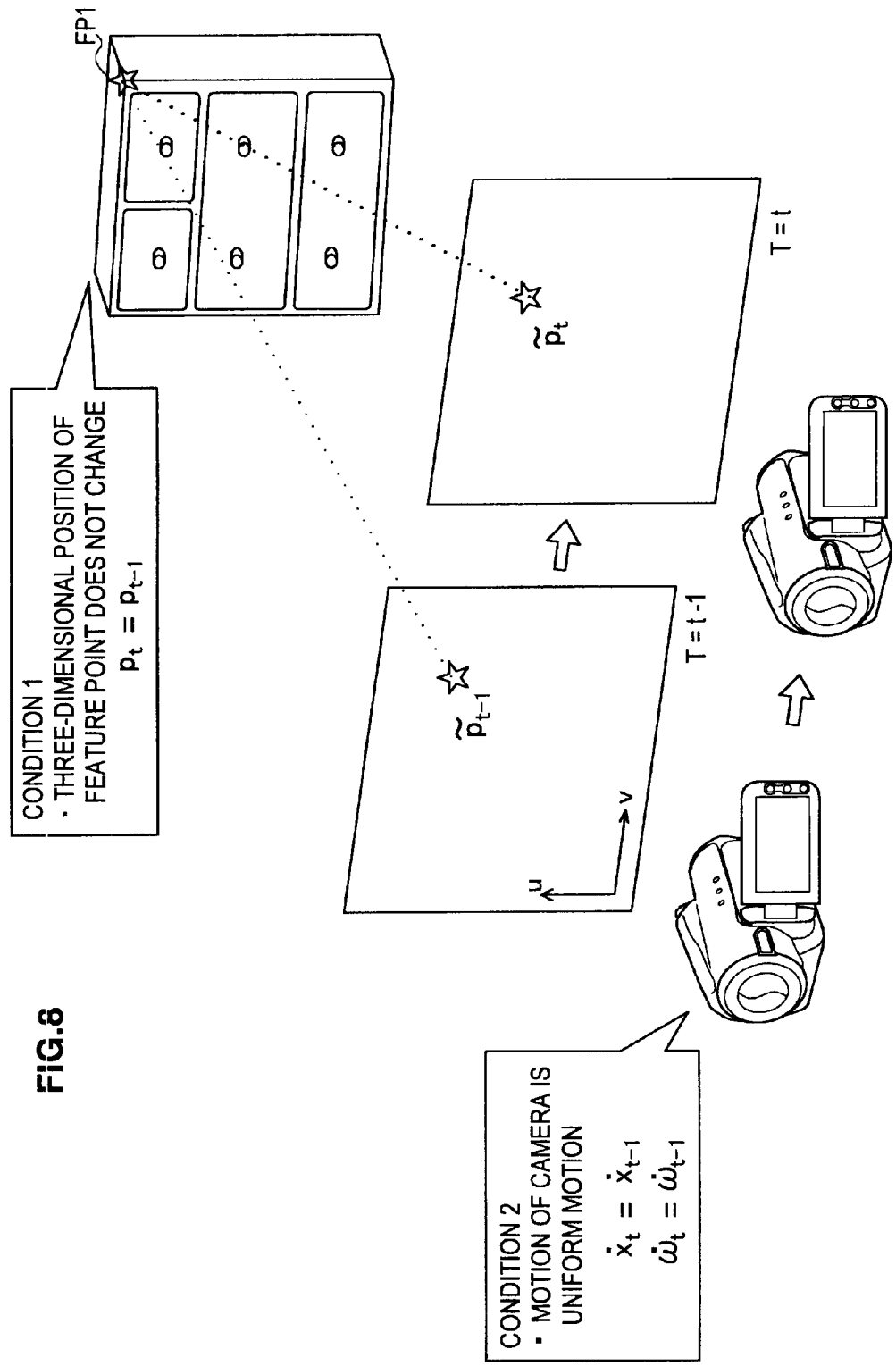
FIG. 6 is an illustrative diagram for illustrating a feature point set on an object.

FIG. 6 illustrates two examples of the objects and an example of feature points (FPs) and patches set on each object. A left object in FIG. 6 is the object representing the drawer (refer to FIG. 6a). A plurality of feature points including a feature point FP1 are set on the object. Further, a patch Pth1 is defined in relation to the feature point FP1. On the other hand, a right object in FIG. 6 is the object representing a calendar (refer to FIG. 6b). A plurality of feature points including a feature point FP2 are set on the object. Further, a patch Pth2 is defined in relation to the feature point FP2.

Upon obtaining an input image from the imaging unit 102, the self-position detecting unit 120 matches partial images included in the input image against the patch for each feature point illustrated in FIG. 6 stored in advance in the data storage unit 130. The self-position detecting unit 120 then specifies a position of each feature point included in the input image (a position of a center pixel of the detected patch, for example) as a result of the matching.

It should be noted that, for tracking feature points (step S114 in FIG. 5), it is not necessary to store data regarding all of the feature points to be tracked in the data storage unit 130 in advance. For example, six feature points are detected in the input image at time T=t−1 in an example illustrated in FIG. 7 (refer to FIG. 7a). Next, when the position or the posture of the camera changes at time T=t, only two of the six feature points present in the input image at the time T=t−1 are present in the input image. In this case, the self-position detecting unit 120 may newly set feature points at positions where a characteristic pixel pattern of the input image is present and use the new feature points in the self-position detection process for a subsequent frame. For example, in the example illustrated in FIG. 7, four new feature points are set on the object at the time T=t (refer to FIG. 7b). This is a feature of the SLAM technology, and according to this, a cost of setting all of the feature points in advance may be reduced and accuracy of the process may be improved using the increased number of feature points.

(1-2) Prediction of State Variable

In this embodiment, the self-position detecting unit 120 uses a state variable X expressed in the following equation as the state variable to be applied for the extended Kalman filter.

[Equation 1]

$$X = \begin{pmatrix} x \\ \omega \\ \dot{x} \\ \dot{\omega} \\ p_1 \\ \vdots \\ p_n \end{pmatrix} \quad (1)$$

The first element of the state variable X in the equation (1) represents a three-dimensional position of the camera in a global coordinate system (x, y, z) being a coordinate system set in the real space, as expressed in a following equation.

[Equation 2]

$$x = \begin{pmatrix} x_c \\ y_c \\ z_c \end{pmatrix} \quad (2)$$

Also, the second element of the state variable is a four-dimensional vector ω having a quaternion as an element corresponding to a rotation matrix representing the posture of the camera. Note that, the posture of the camera may be represented using an Euler angle in place of the quaternion. Also, the third and the fourth elements of the state variable represent the moving speed and the angular speed of the camera, respectively.

Further, the fifth and subsequent elements of the state variable represent a three-dimensional position $p_i$ of a feature point $FP_i$ (i=1 . . . N) in the global coordinate system as expressed in a following equation. Note that, as described above, the number N of the feature points may change during the process.

[Equation 3]

$$p_i = \begin{pmatrix} x_i \\ y_i \\ z_i \end{pmatrix} \quad (3)$$

The self-position detecting unit 120 generates the predicted value of the state variable for a latest frame based on the value of the state variable X initialized at the step S102 or the value of the state variable X updated in a previous frame. The predicted value of the state variable is generated according to a state equation of the extended Kalman filter according to multidimensional normal distribution as shown in the following equation.

[Equation 4]

$$\text{predicted state variable } \hat{X} = F(X,a) + w \quad (4)$$

Herein, F represents the prediction model regarding state transition of a system and "a" represents a prediction condition. Also, w represents Gaussian noise and may include a model approximation error, an observation error and the like, for example. In general, an average of the Gaussian noise w is 0.

FIG. 8 is an illustrative diagram for illustrating an example of the prediction model according to this embodiment. With reference to FIG. 8, two prediction conditions in the prediction model according to this embodiment are illustrated. First, as a first condition, suppose that the three-dimensional position of the feature point in the global coordinate system does not change. That is, provided that the three-dimensional position of the feature point FP1 at the time T is $p_T$, the following relationship is satisfied.

[Equation 5]

$$p_t = p_{t-1} \quad (5)$$

Next, as a second condition, suppose that motion of the camera is uniform motion. That is, a following relationship is satisfied for the speed and the angular speed of the camera from the time T=t−1 to the time T=t.

[Equation 6]

$$\dot{x}_t = \dot{x}_{t-1} \quad (6)$$

$$\dot{\omega}_t = \dot{\omega}_{t-1} \quad (7)$$

The self-position detecting unit 120 generates the predicted value of the state variable for the latest frame based on such prediction model and the state equation expressed in the equation (4).

(1-3) Updating of State Variable

The self-position detecting unit 120 then evaluates an error between observation information predicted from the predicted value of the state variable and actual observation information obtained as a result of feature point tracking, using an observation equation, for example. Note that, v in the equation (8) is the error.

[Equation 7]

$$\text{observation information } s = H(\hat{X}) + v \quad (8)$$

$$\text{predicted observation information } \hat{s} = H(\hat{X}) \quad (9)$$

Herein, H represents an observation model. For example, a position of the feature point $FP_i$ on the imaging plane (u-v plane) is defined as expressed in a following equation.

[Equation 8]

$$\text{position of } FP_i \text{ on imaging plane } \tilde{p}_i = \begin{pmatrix} u_i \\ v_i \\ 1 \end{pmatrix} \quad (10)$$

Herein, all of the position of the camera x, the posture of the camera ω and the three-dimensional position $p_i$ of the feature point $FP_i$ are given as the elements of the state variable X. Then, the position of the feature point $FP_i$ on the imaging plane is derived using a following equation according to a pinhole model.

[Equation 9]

$$\lambda \tilde{p}_i = A R_\omega (p_i - x) \quad (11)$$

Herein, λ represents a parameter for normalization, A represents a camera internal parameter, $R_\omega$ represents the rotation matrix corresponding to the quaternion ω representing the posture of the camera included in the state variable X. The camera internal parameter A is given in advance as expressed in the following equation according to characteristics of the imaging device, which takes the input image.

[Equation 10]

$$A = \begin{pmatrix} -f \cdot k_u & f \cdot k_u \cdot \cot\theta & u_o \\ 0 & -\dfrac{f \cdot k_v}{\sin\theta} & v_o \\ 0 & 0 & 1 \end{pmatrix} \quad (12)$$

Herein, f represents focal distance, θ represents orthogonality of an image axis (ideal value is 90 degrees), $k_u$ represents a scale along a longitudinal axis of the imaging plane (rate of change of scale from the global coordinate system to the coordinate system of the imaging plane), $k_v$ represents a scale along an abscissa axis of the imaging plane, and $(u_o, v_o)$ represents a center position of the imaging plane.

Therefore, a feasible latest state variable X may be obtained by searching the state variable X, which makes the error between the predicted observation information derived using the equation (11), that is, the position of each feature point on the imaging plane and the result of feature point tracking at the step S114 in FIG. 5 minimum.

[Equation 11]

$$\text{latest state variable } X \leftarrow \hat{X} + \text{Innov}(s - \hat{s}) \quad (13)$$

The self-position detecting unit 120 outputs the position x and the posture ω of the camera (imaging device) dynamically updated by applying the SLAM technology in this manner to the environment map building unit 150 and the output image generating unit 180.

(2) Data Storage Unit

The data storage unit 130 stores in advance the feature data indicating the feature of the object corresponding to the object, which may be present in the real space using a storage medium such as a hard disk or a semiconductor memory. Although an example in which the data storage unit 130 is a part of the environment map generating unit 110 is illustrated in FIG. 4, this is not limited to such an example, and the data storage unit 130 may be provided outside the environment map generating unit 110. FIG. 9 is an illustrative diagram for illustrating an example of a configuration of the feature data.

With reference to FIG. 9, feature data FD1 as an example about the object Obj1 is illustrated. The feature data FD1 includes an object name FD11, image data FD12 taken from six directions, patch data FD13, three-dimensional shape data FD14 and ontology data FD15.

The object name FD11 is the name with which a corresponding object may be specified such as a "coffee cup A".

The image data FD12 includes six image data obtained by taking images of the corresponding object from six directions (front, back, left, right, above and below), for example. The patch data FD13 is a set of small images around each feature point for each of one or more feature points set on each object. The image data FD12 and the patch data FD13 may be used for an object recognition process by the image recognizing unit 140 to be described later. Also, the patch data FD13 may be used for the above-described self-position detection process by the self-position detecting unit 120.

The three-dimensional shape data FD14 includes polygon information for recognizing a shape of the corresponding object and three-dimensional positional information of feature points. The three-dimensional shape data FD14 may be used for an environment map build process by the environment map building unit 150 and a CG image generation process for each object to be described later.

The ontology data FD15 is the data, which may be used to assist the environment map build process by the environment map building unit 150, for example. In an example illustrated in FIG. 9, the ontology data FD15 indicates that the object Obj1, which is the coffee cup, is likely to come in contact with an object corresponding to a desk or a dishwasher and is unlikely to come in contact with an object corresponding to a bookshelf.

(3) Image Recognizing Unit

The image recognizing unit 140 specifies correspondences between physical objects present in the input image and data objects using the above-described feature data stored in the data storage unit 130.

Figure 10:
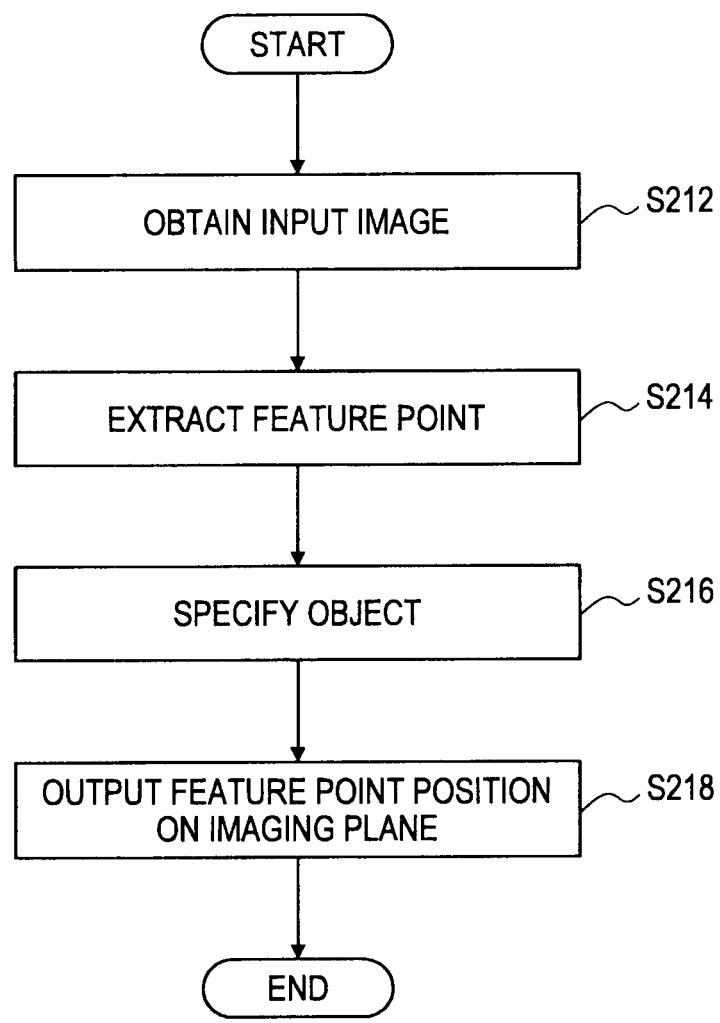
FIG. 10 is a flowchart illustrating an example of flow of an object recognition process according to the first embodiment.

FIG. 10 is a flowchart illustrating an example of flow of the object recognition process by the image recognizing unit 140. With reference to FIG. 10, the image recognizing unit 140 first obtains the input image from the imaging unit 102 (step S212). Next, the image recognizing unit 140 matches partial images included in the input image against patches of one or more feature points of each object included in the feature data to extract feature points included in the input image (step S214). It should be noted that the feature points used in the object recognition process by the image recognizing unit 140 and the feature points used in the self-position detection process by the self-position detecting unit 120 are not necessarily the same. However, when common feature points are used in the both processes, the image recognizing unit 140 may reuse the result of feature point tracking by the self-position detecting unit 120.

Next, the image recognizing unit 140 specifies the object present in the input image based on an extraction result of the feature point (step S216). For example, when the feature points belonging to one object are extracted with high density in a certain area, the image recognizing unit 140 may recognize that the object is present in the area. The image recognizing unit 140 then outputs the object name (or an identifier) of the specified object and the position of the feature point belonging to the object on the imaging plane to the environment map building unit 150 (step S218).

(4) Environment Map Building Unit

The environment map building unit 150 generates the environment map using the position and the posture of the camera input from the self-position detecting unit 120, the positions of the feature points on the imaging plane input from the image recognizing unit 140 and the feature data stored in the data storage unit 130. In this specification, the environment map is a set of data indicating positions (and postures) of one or more objects present in the real space. The environment map may include object names corresponding to objects, the three-dimensional positions of feature points belonging to objects and the polygon information configuring shapes of objects, for example. The environment map may be built by obtaining the three-dimensional position of each feature point according to the above-described pinhole model from the position of the feature point on the imaging plane input from the image recognizing unit 140, for example.

By deforming the relation equation of the pinhole model expressed in the equation (11), the three-dimensional position pi of the feature point $FP_i$ in the global coordinate system may be obtained by a following equation.

[Equation 12]

$$p_i = x + \lambda \cdot R_\omega^T \cdot A^{-1} \cdot \tilde{p}_i = x + d \cdot R_\omega^T \frac{A^{-1} \cdot \tilde{p}_i}{\|A^{-1} \cdot \tilde{p}_i\|} \quad (14)$$

Herein, d represents distance between the camera and each feature point in the global coordinate system. The environment map building unit 150 may calculate such distance d based on the positions of at least four feature points on the imaging plane and the distance between the feature points for each object. The distance between the feature points is stored in advance in the data storage unit 130 as the three-dimensional shape data FD14 included in the feature data illustrated with reference to FIG. 9. It should be noted that, a calculation process of the distance d in the equation (14) is disclosed in detail in the above-described Japanese Patent Application Laid-Open No. 2008-304268.

After the distance d is calculated, remaining variables of a right side of the equation (14) are the position and the posture of the camera input from the self-position detecting unit 120 and the position of the feature point on the imaging plane input from the image recognizing unit 140, and all of which are known. The environment map building unit 150 then calculates the three-dimensional position in the global coordinate system for each feature point input from the image recognizing unit 140 according to the equation (14). The environment map building unit 150 then builds a latest environment map according to the three-dimensional position of each calculated feature point and allows the environment map storage unit 152 to store the built environment map. It should be noted that, at that time, the environment map building unit 150 may improve accuracy of the data of the environment map using the ontology data FD15 included in the feature data illustrated with reference to FIG. 9.

The environment map storage unit 152 stores the environment map built by the environment map building unit 150 using the storage medium such as the hard disk or the semiconductor memory.

[2-3. Output Image Generating Unit]

The output image generating unit 180 generates an output image whereby an erasing target object is erased from the input image based on a position (in the environment map) of the erasing target object specified out of the objects present in the input image and the position of the imaging device. As illustrated in FIG. 4, in this embodiment, the output image generating unit 180 includes an erasing target selecting unit 182, a CG image generating unit 184, an erased area determining unit 186 and an image superimposing unit 188.

(1) Erasing Target Selecting Unit

The erasing target selecting unit 182 selects an erasing target object to be erased from the output image, out of the objects present in the input image. The erasing target selecting unit 182 may display the input image Im01 illustrated in FIG. 2 on a screen of the image processing device 100 to allow the user to designate the object wanted to be erased, for example. Instead, the erasing target selecting unit 182 may allow an optional application to designate the object to be erased. The erasing target selecting unit 182 selects the object designated by the user or the application as the erasing target object, for example, and outputs an erasing target identifier to specify the erasing target object to the CG image generating unit 184 and the erased area determining unit 186.

(2) CG Image Generating Unit

The CG image generating unit 184 generates a CG image to be superimposed on the input image, used for erasing the erasing target object selected by the erasing target selecting unit 182 from the input image.

More specifically the CG image generating unit 184 obtains the latest environment map through the environment map building unit 150. Also, the CG image generating unit 184 obtains latest position and posture of the camera from the self-position detecting unit 120. The CG image generating unit 184 then generates the CG image in which objects other than the erasing target object are visualized based on a three-dimensional position of the objects other than the erasing target object represented by the latest environment map and the position and the posture of the camera.

Figure 11:
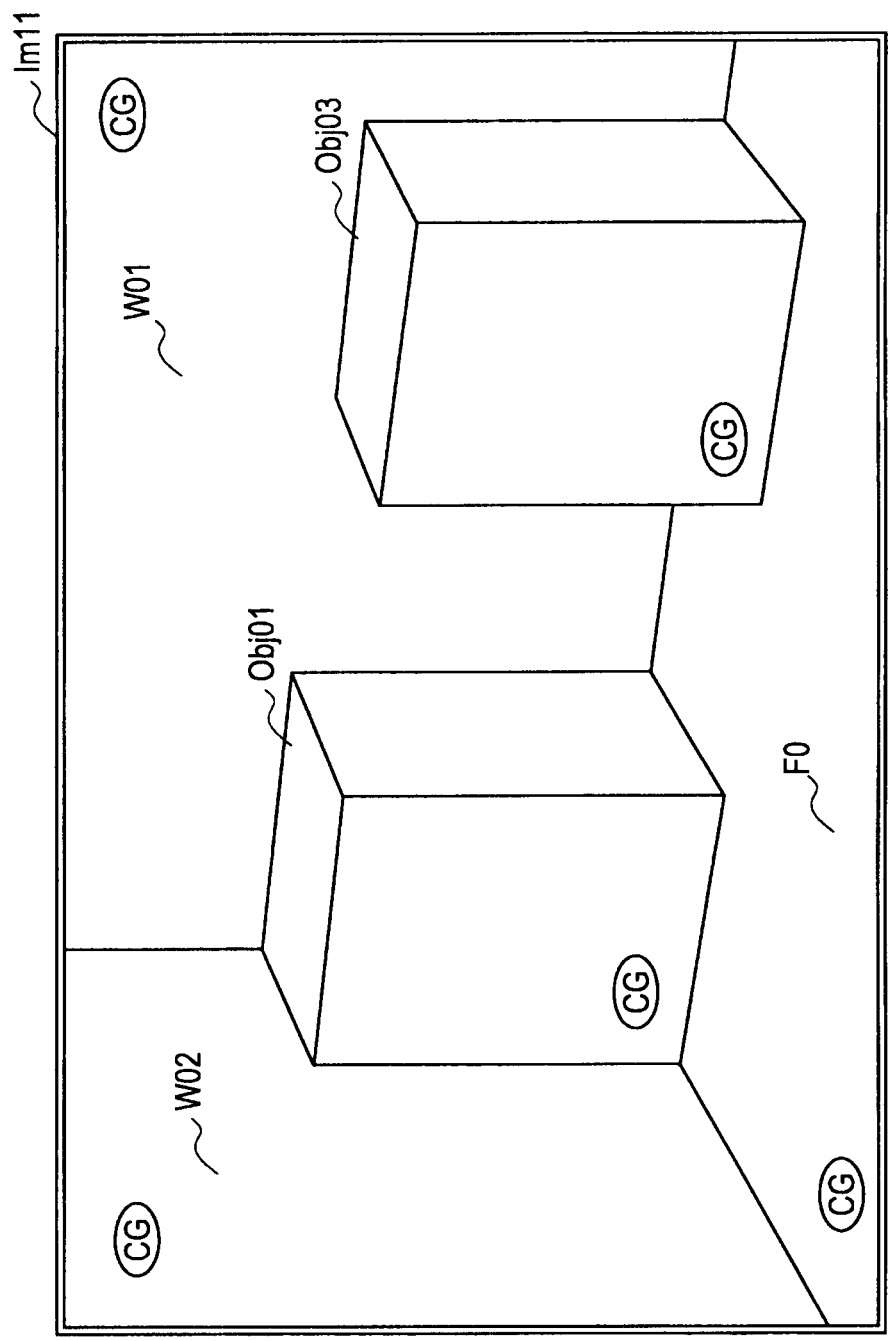
FIG. 11 is an illustrative diagram for illustrating an example of a CG image generated by a CG image generating unit according to the first embodiment.

FIG. 11 is an illustrative diagram for illustrating an example of a CG image generated by the CG image generating unit 184. With reference to FIG. 11, the CG image Im11 as an example generated by the CG image generating unit 184 is illustrated. Note that, it is herein supposed that the object Obj02 out of the objects present in the environment 1 illustrated in FIG. 1 is selected as the erasing target object. Also, in the CG image Im11, a mark ("CG") is given to each object indicating that the object is visualized using CG for the sake of convenience. Such marks are not displayed on an actual CG image.

As is understood from FIG. 11, the CG image Im11 includes the objects Obj01 and Obj03, the wall surfaces W01 and W02 and the floor surface F0 except the erasing target object Obj02 out of the objects present in the environment 1. The CG image generating unit 184 may generate such CG image Im11 using the equation (11) according to the pinhole model, for example, based on a three-dimensional position of each object represented by the environment map and the position and the posture of the camera. The CG image generating unit 184 then outputs the generated CG image to the image superimposing unit 188.

(3) Erased Area Determining Unit

The erased area determining unit 186 determines an erased area, which is the area in the input image corresponding to the erasing target object selected by the erasing target selecting unit 182.

More specifically, the erased area determining unit 186 obtains the latest environment map through the environment map building unit 150. Also, the erased area determining unit 186 obtains the latest position of the camera from the self-position detecting unit 120. The erased area determining unit 186 then specifies the object in the environment map located the nearest to the camera on a straight line passing from a focal point of the camera through each pixel, for example. Herein, when the specified object is the erasing target object, it is determined that the pixel belongs to the erased area. On the other hand, when the specified object is not the erasing target object (or when there is no object in the environment map on the straight line), it is determined that the pixel does not belong to the erased area.

Figure 12:
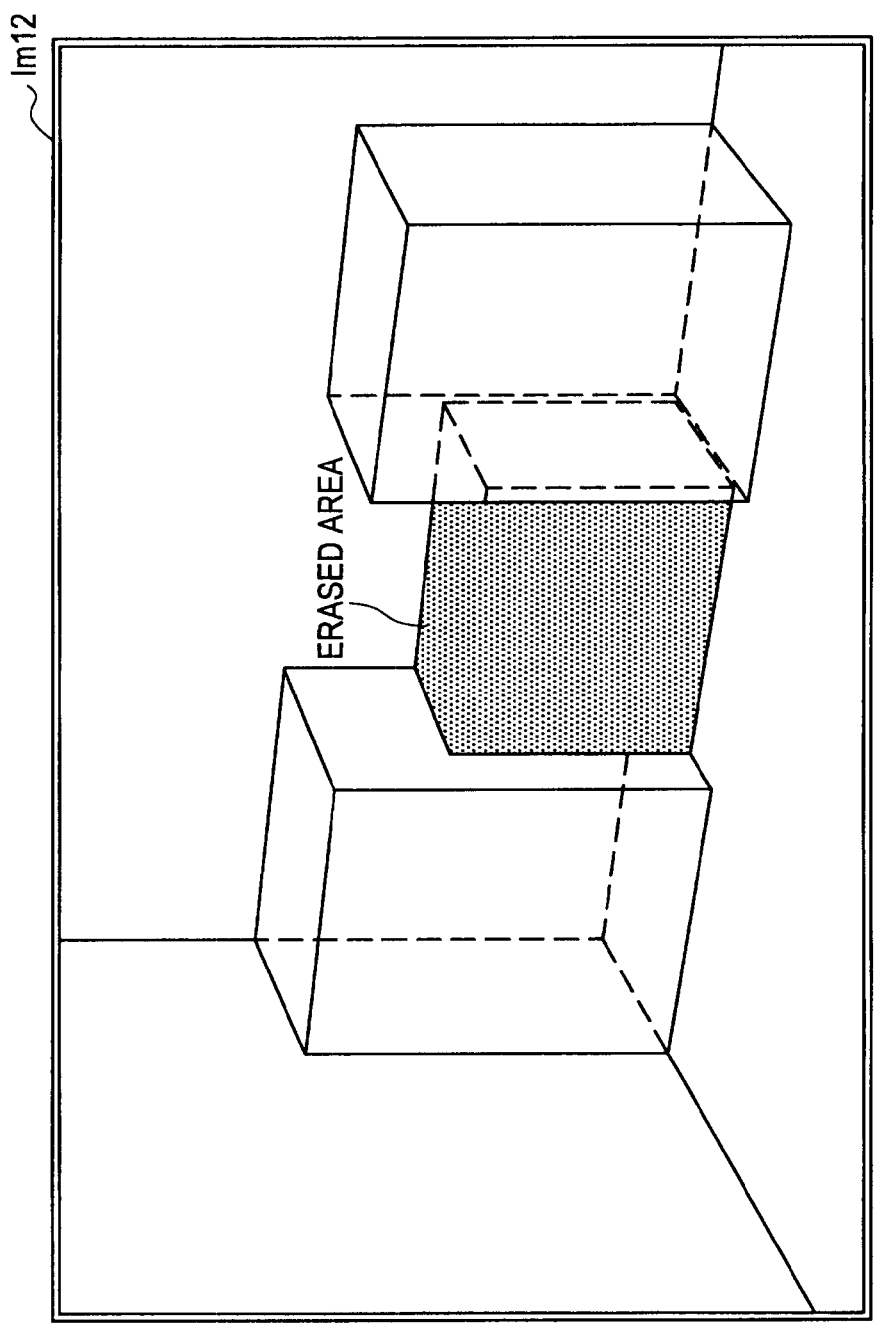
FIG. 12 is an illustrative diagram for illustrating an example of an erased area determined by an erased area determining unit according to the first embodiment.

FIG. 12 is an illustrative diagram for illustrating an example of the erased area determined by the erased area determining unit 186. With reference to FIG. 12, the erased area in a case in which the object Obj02 is made the erasing target object in the input image Im01 illustrated in FIG. 2 is illustrated in an image Im12 by being masked. The erased area determining unit 186 determines whether the pixel belongs to the erased area for each pixel in this manner and outputs the result to the image superimposing unit 188.

(4) Image Superimposing Unit

The image superimposing unit 188 generates the output image by superimposing the CG image generated by the CG image generating unit 184 onto the input image for at least a part of the erased area determined by the erased area determining unit 186.

Figure 13:
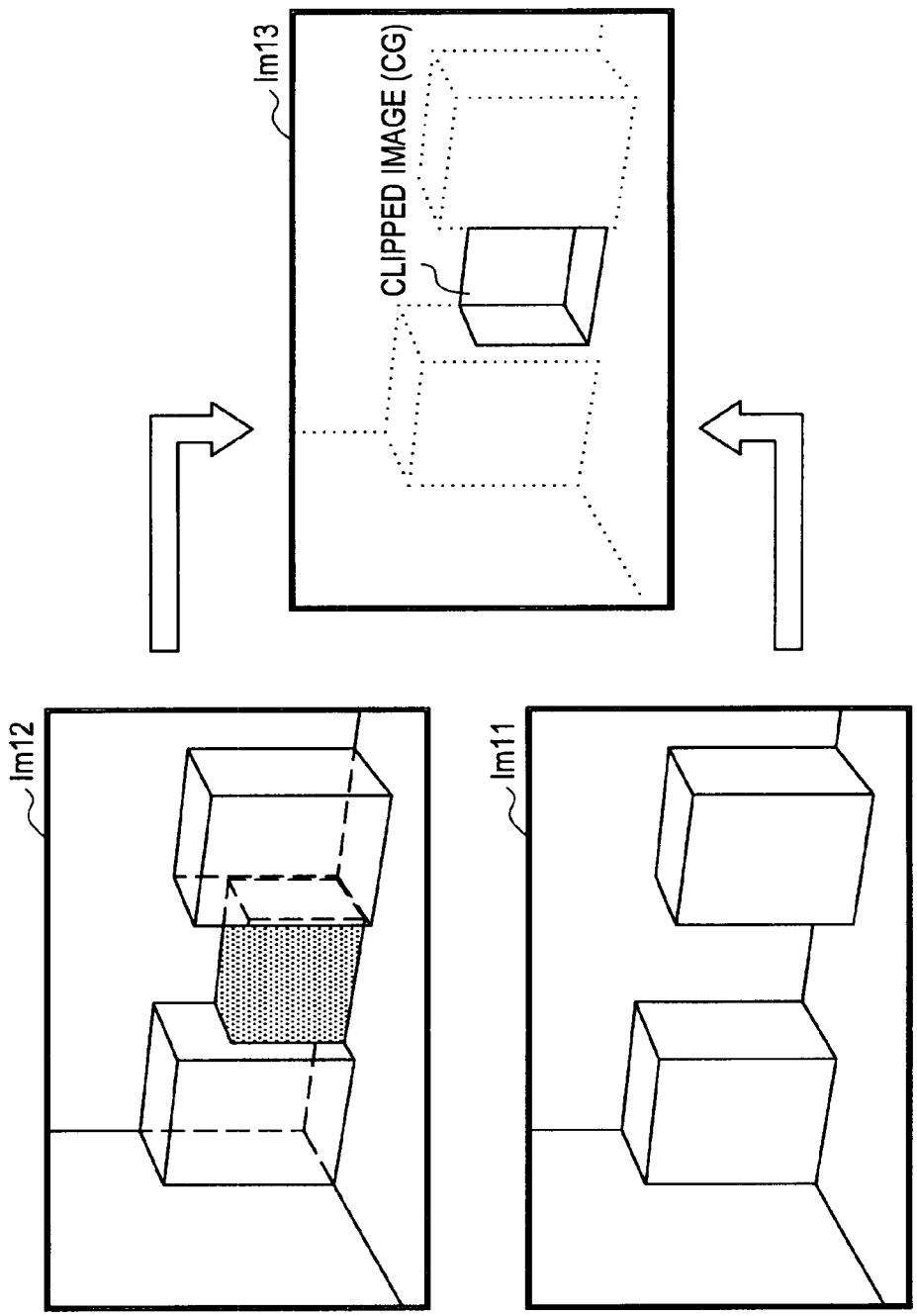
FIG. 13 is a first illustrative diagram for illustrating superimposition of the CG image on the input image according to the first embodiment.
Figure 14:
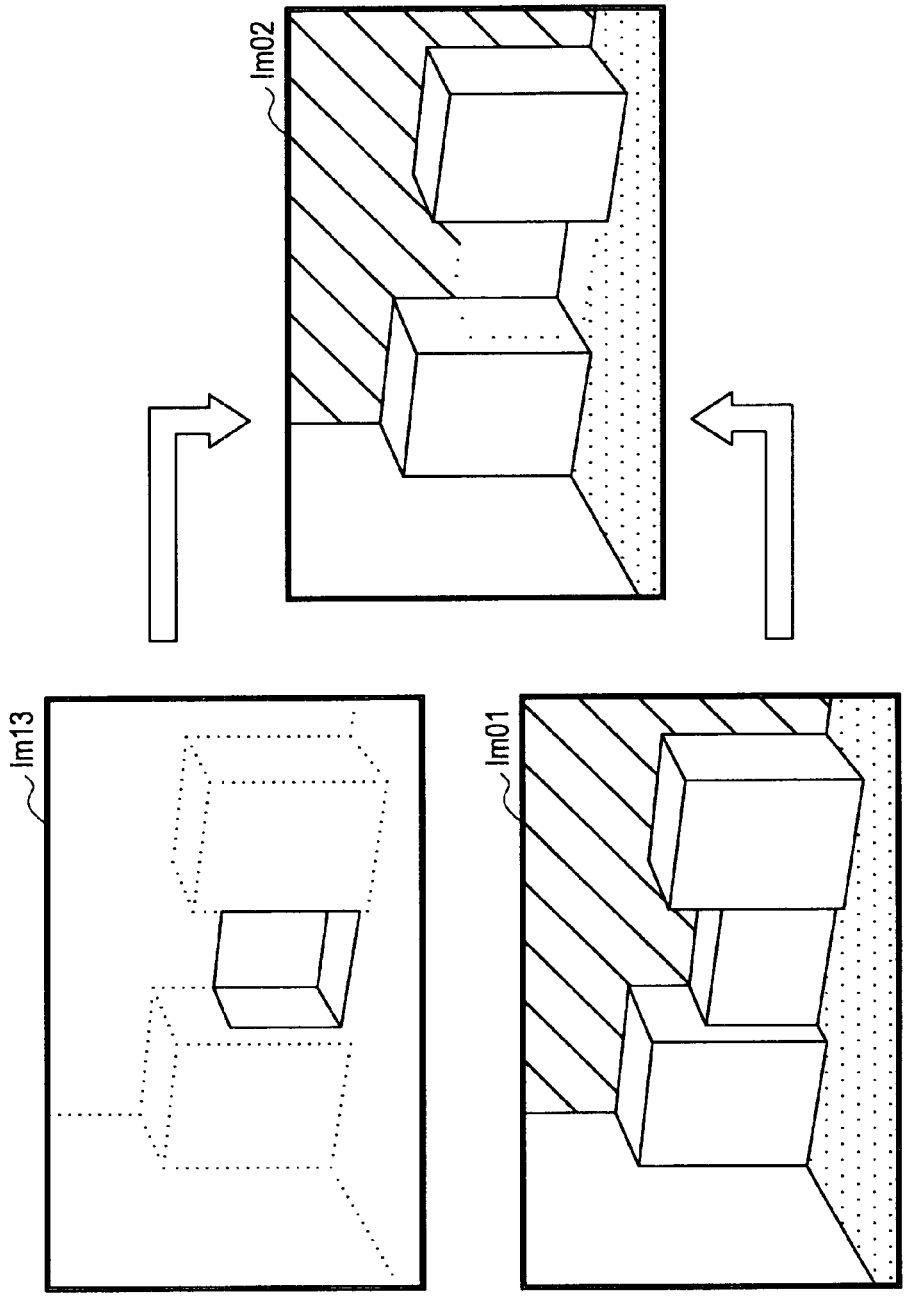
FIG. 14 is a second illustrative diagram for illustrating the superimposition of the CG image on the input image according to the first embodiment.

FIGS. 13 and 14 are illustrative diagrams for illustrating superimposition of the CG image on the input image by the image superimposing unit 188.

The image Im12 representing the erased area as an example determined by the erased area determining unit 186 is illustrated in an upper left part of FIG. 13. Also, the CG image Im11 as an example generated by the CG image generating unit 184 is illustrated in a lower left part of FIG. 13. The image superimposing unit 188 generates a clipped image obtained by clipping only a part corresponding to the erased area from such CG image Im11. An image Im13 including the clipped image, which is the CG image, is illustrated in a right part of FIG. 13.

Next, the image Im13 including the clipped image illustrated with reference to FIG. 13 is illustrated in an upper left part of FIG. 14. Also, the input image Im01 as an example input from the imaging unit 102 is illustrated in a lower left part of FIG. 14. The image superimposing unit 188 generates the output image Im02 by superimposing the clipped image on such input image Im01. The output image Im02 in which a part corresponding to the erased area of the input image Im01 is replaced with the CG image is illustrated in a right part of FIG. 14.

The image superimposing unit 188 then outputs the output image Im02 generated in this manner to the screen (or another functional unit as necessary) of the image processing device 100 as a result of the process by the image processing device 100.

[2-4. Summary of First Embodiment]

According to the image processing device 100 according to this embodiment, the output image obtained by erasing the erasing target object is generated based on the environment map representing the three-dimensional position of objects corresponding to 1 objects existing in the real space. According to this, it becomes not necessary to take a background image in advance, and it becomes possible to erase even physical objects which are hard to be moved from the output image.

Also, according to this embodiment, the position and the posture of the imaging device utilized when generating the output image are dynamically detected using the SLAM technology. According to this, even in a case in which the position and the posture of the imaging device change for each frame, it is possible to appropriately generate the output image obtained by erasing the erasing target object according to the changing position and posture of the imaging device.

Also, in the input image, the CG image generated based on the environment map is superimposed on the erased area in which the erasing target object is shown. According to this, a natural output image also for the erased area may be output.

Also, the environment map is built based on the feature data for each object stored in advance in the data storage unit 130. Therefore, it is possible to flexibly erase the object present in the input image of real space, from the output image by adding the feature data even when a condition of subject real space changes.

3. Second Embodiment

In the first embodiment, an example in which the wall surface and the floor surface in the real space are also recognized as the objects is described. On the other hand, in a case in which the feature data corresponding to the wall surface or the floor surface is not defined in advance, the wall surface or the floor surface is not included in the environment map, so that an appropriate pixel value to be displayed behind the erased object might not be configured. In this case, it is preferable to additionally recognize the wall surface or the floor surface to generate the output image according to a recognition result. Therefore, in this section, an example of the configuration of the image processing device capable of additionally recognizing the wall surface or the floor surface when the wall surface or the floor surface is not included in the environment map is described as a second embodiment of the present invention.

Figure 15:
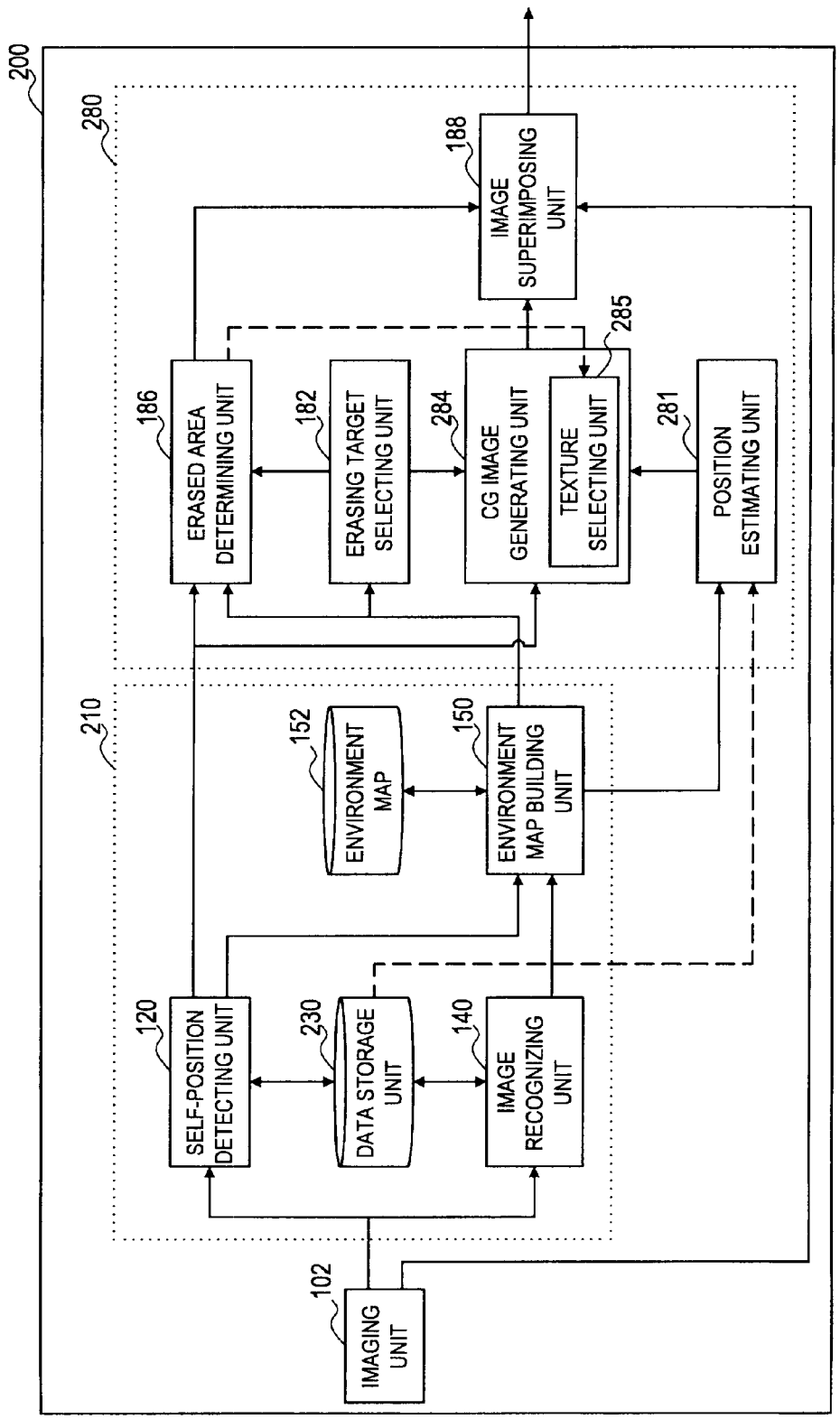
FIG. 15 is a block diagram illustrating an example of the configuration of the image processing device according to a second embodiment.

FIG. 15 is a block diagram illustrating an example of a configuration of an image processing device 200 according to the second embodiment. With reference to FIG. 15, the image processing device 200 includes the imaging unit 102, an environment map generating unit 210 and an output image generating unit 280.

[3-1. Environment Map Generating Unit]

In this embodiment, the environment map generating unit 210 includes the self-position detecting unit 120, a data storage unit 230, the image recognizing unit 140, the environment map building unit 150 and the environment map storage unit 152.

(1) Data Storage Unit

Figure 16:
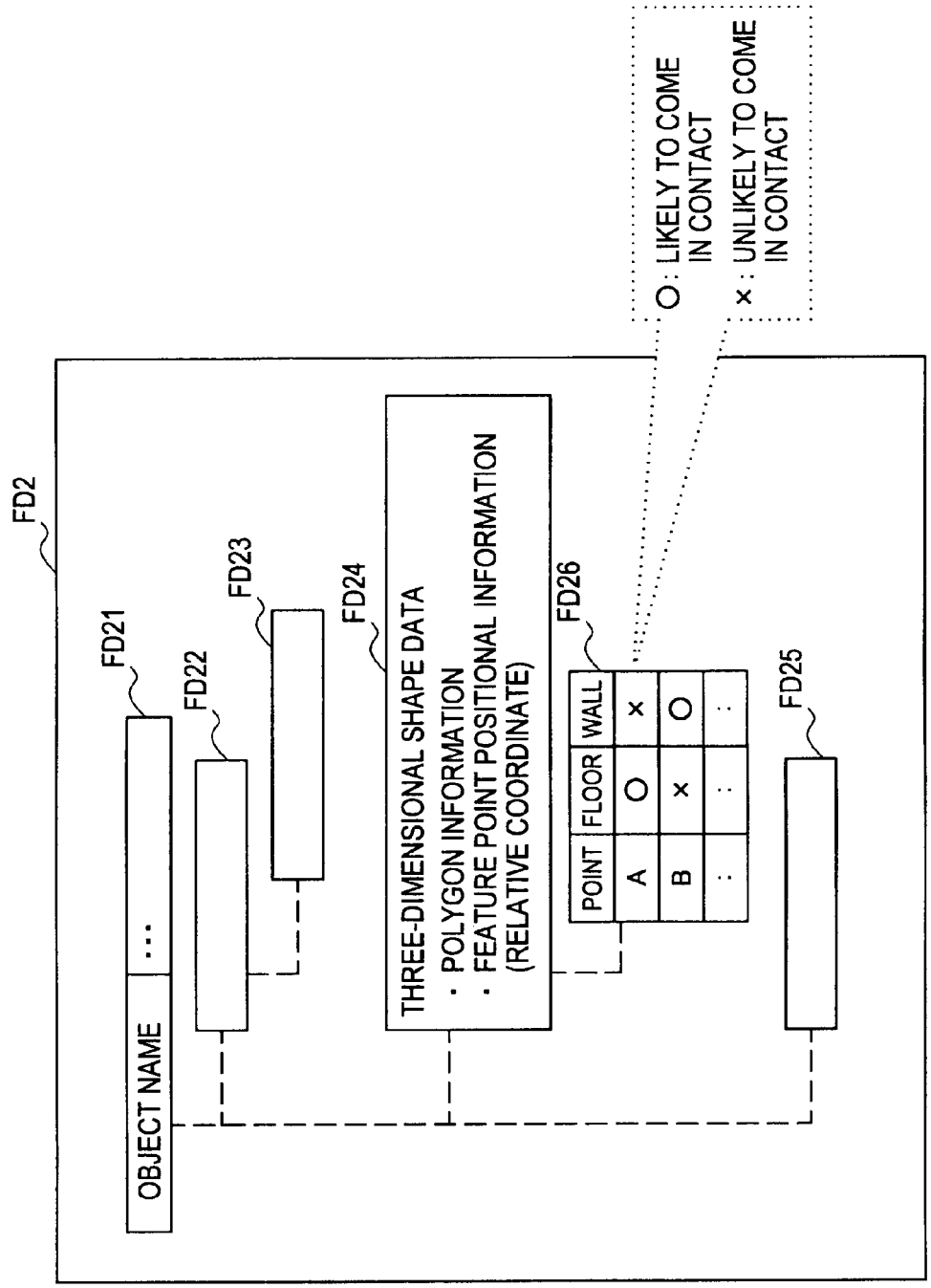
FIG. 16 is an illustrative diagram for illustrating another example of the configuration of the feature data.

The data storage unit 230 stores in advance the feature data indicating features of objects corresponding to physical objects, which may exist in the real space, using the storage medium such as the hard disk or the semiconductor memory. In this embodiment, the feature data includes additional data indicating whether a vertex composing the polygon of each object is likely to come in contact with the floor surface or the wall surface in addition to the data illustrated in FIG. 9. FIG. 16 is an illustrative diagram for illustrating an example of the configuration of such feature data.

With reference to FIG. 16, feature data FD2 as an example includes an object name FD21, image data FD22 taken from six directions, patch data FD23, three-dimensional shape data FD24, ontology data FD25 and additional data FD26.

The additional data FD26 has two flags indicating, for each vertex of the polygon of each object defined by the polygon information included in the three-dimensional shape data FD24, whether the vertex is likely to come in contact with the floor surface and whether the vertex is likely to come in contact with the wall surface. For example, in an example illustrated in FIG. 16, the additional data FD26 indicates that a vertex A of the polygon of the object corresponding to the feature data FD2 is likely to come in contact with the floor surface and unlikely to come in contact with the wall surface. Also, the additional data FD26 indicates that a vertex B of the polygon of the object corresponding to the feature data FD2 is unlikely to come in contact with the floor surface and is likely to come in contact with the wall surface. It should be noted that the vertex of the polygon may be the feature points used in the above-described process by the self-position detecting unit 120 or the image recognizing unit 140 or may be some points other than the feature points.

Figure 17:
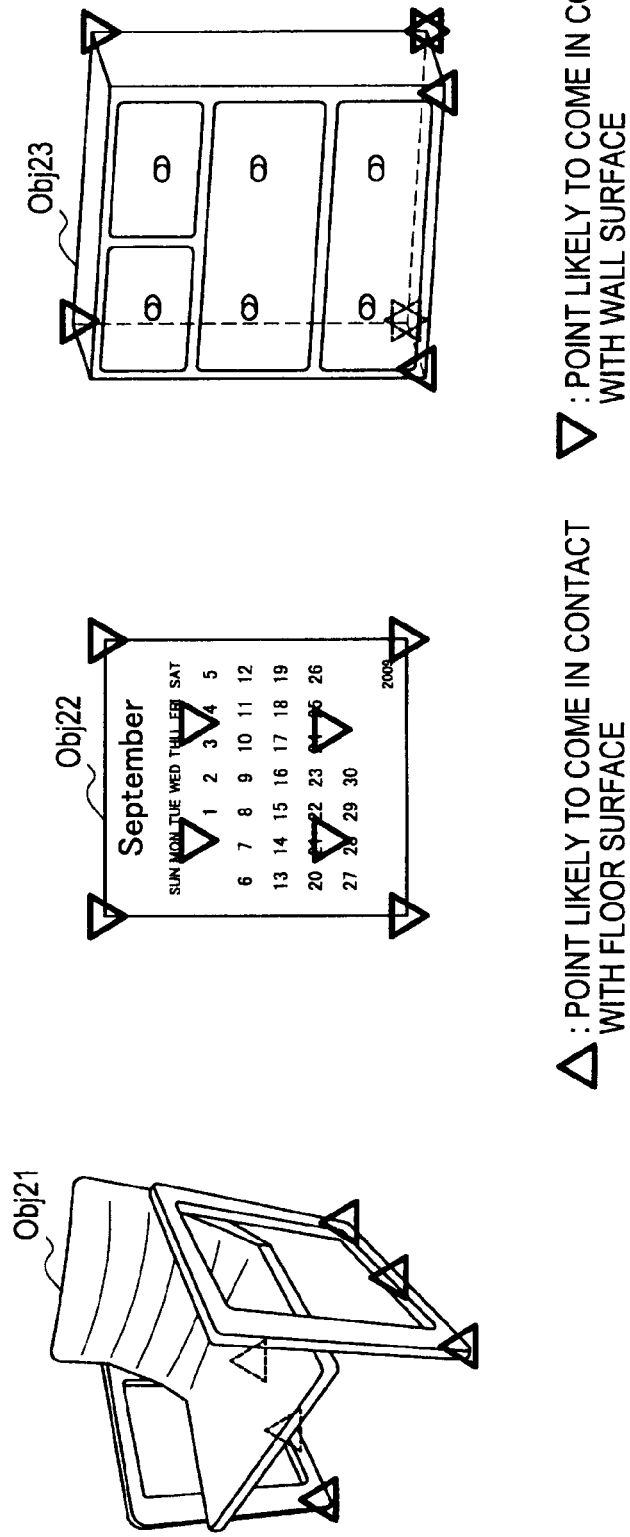
FIG. 17 is an illustrative diagram for illustrating an example of a polygon related to the feature data illustrated in FIG. 16.

FIG. 17 is an illustrative diagram for illustrating an example of the polygon related to the feature data illustrated in FIG. 16. With reference to FIG. 17, three objects Obj21, Obj22 and Obj23 are illustrated. Out of them, the object Obj21 represents a chair. Out of the vertexes of the polygon corresponding to the object Obj21, six vertexes of a portion of legs of the chair are likely to come in contact with the floor surface. Also, the object Obj22 represents the calendar. Eight vertexes out of the vertexes of the polygon corresponding to the object Obj22 are likely to come in contact with the wall surface. Also, the object Obj23 represents the drawer. Four vertexes located on a bottom surface of the drawer out of the vertexes of the polygon corresponding to the object Obj23 are likely to come in contact with the floor surface. Four vertexes located on a rear surface of the drawer out of the vertexes of the polygon corresponding to the object Obj23 are likely to come in contact with the wall surface. The additional data FD26 illustrated in FIG. 16 defines such attribution of each vertex.

In this embodiment, the data storage unit 230 of the environment map generating unit 210 stores the feature data including the above-described additional data and outputs the additional data according to request from a position estimating unit 281.

[3-2. Output Image Generating Unit]

As illustrated in FIG. 15, in this embodiment, the output image generating unit 280 includes the position estimating unit 281, the erasing target selecting unit 182, a CG image generating unit 284, the erased area determining unit 186 and the image superimposing unit 188.

(1) Position Estimating Unit

The position estimating unit 281 estimates a position of the floor surface or the wall surface in the real space based on positions of points on surfaces of objects represented by the environment map and the above-described feature data. In this embodiment, the points on the surfaces of the objects may be the vertex of the polygon corresponding to each of the above-described objects.

More specifically, the position estimating unit 281 extracts a vertex group indicated by the above-described feature data to be likely to come in contact with the floor surface out of vertex groups of the polygon of the object included in the environment map input from the environment map building unit 150, for example. The position estimating unit 281 then estimates a plane corresponding to the floor surface based on a three-dimensional position of the extracted vertex group in the global coordinate system. The position estimating unit 281 may estimate a feasible plane, which may include the vertex group, from the three-dimensional position of the vertex group using a well-known method of Hough transform, for example.

Similarly, the position estimating unit 281 extracts the vertex group indicated by the above-described feature data to be likely to come in contact with the wall surface out of the vertex groups of the polygon of the object included in the environment map input from the environment map building unit 150, for example. The position estimating unit 281 then estimates a plane corresponding to the wall surface based on the three-dimensional position of the extracted vertex group in the global coordinate system. It should be noted that, in a case in which two or more wall surfaces might be present in the real space, the position estimating unit 281 may divide the vertex groups into two or more sets according to the three-dimensional positions thereof, thereby estimating the plane corresponding to the wall surface for each set.

The position estimating unit 281 outputs the position of the floor surface and/or the wall surface estimated in this manner to the CG image generating unit 284.

(2) CG Image Generating Unit

The CG image generating unit 284 generates the CG image to be superimposed on the input image, based on the three-dimensional position of the object other than the erasing target object represented by the environment map, the position and the posture of the camera and the position of the floor surface or the wall surface in the real space estimated by the position estimating unit 281.

Figure 18:
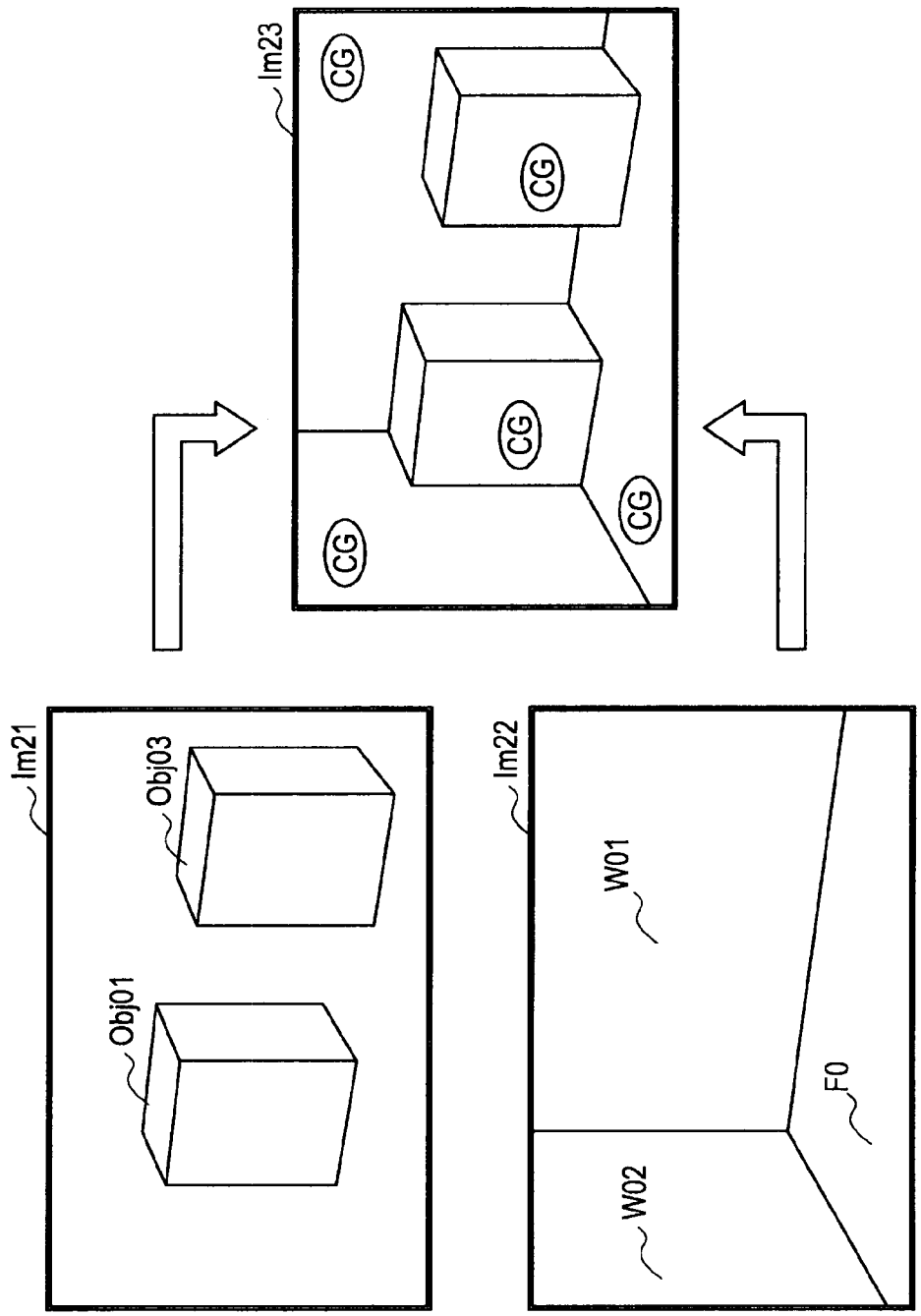
FIG. 18 is an illustrative diagram for illustrating a CG image generation process according to the second embodiment.

FIG. 18 is an illustrative diagram for illustrating the CG image generation process by the CG image generating unit 284 according to this embodiment. It should be noted that it is herein supposed that the object Obj02 out of the objects present in the environment 1 illustrated in FIG. 1 is selected as the erasing target object. Also, the mark ("CG") indicating that the object is visualized using CG is given to each object in the image for the sake of convenience. Such mark is not displayed on the actual CG image.

First, a CG image Im21 obtained by visualizing the objects Obj01 and Obj03 represented by the environment map is illustrated in an upper left part of FIG. 18. In the CG image Im21, the erasing target object Obj02 is erased. However, since the floor surface and the wall surface are not present behind the erasing target object Obj02, when superimposing the CG image Im21 on the input image, portions corresponding to the floor surface and the wall surface become unnatural blank spaces.

On the other hand, a CG image Im22 obtained by visualizing the floor surface F0 and the wall surfaces W01 and W02 based on the position of the floor surface or the wall surface in the real space estimated by the position estimating unit 281 is illustrated in a lower left part of FIG. 18. The CG image generating unit 284 generates a CG image Im23 including also the floor surface and the wall surface by synthesizing such CG images Im21 and Im22.

The CG image Im23 illustrated in a right part of FIG. 18 has contents equivalent to those of the CG image Im11 illustrated in FIG. 11. The CG image generating unit 284 outputs the CG image Im23 generated in this manner to the image superimposing unit 188. According to this, the image superimposing unit 188 may generate the output image in which the wall surface or the floor surface is appropriately displayed behind the erasing target object even in a case in which the wall surface or the floor surface is not included in the environment map.

(3) Texture Selecting Unit

Note that, when representing the floor surface or the wall surface using CG, the CG image generating unit 284 allows a texture selecting unit 285 to select texture to be drawn, in a case in which the image processing device 200 does not hold information regarding the texture to be drawn, in advance.

The texture selecting unit 285 selects the texture of a portion included in the erased area and the portion in which the floor surface or the wall surface in the real space should be shown according to an image of a portion of the input image in which the floor surface or the wall surface is estimated to be shown.

More specifically, the texture selecting unit 285 specifies an area other than the erased area (hereinafter, referred to as a sample area) included in a portion in which the floor surface F0 is shown in the CG image Im23 illustrated in FIG. 18, for example. The texture selecting unit 285 then sets an average of a pixel value of the sample area in the input image as a pixel value when representing the floor surface F0 using CG; for example. In this case, the texture of the floor surface F0 is a single-colored texture. Instead, in a case in which the sample area in the input image has a certain repeated pattern, the texture selecting unit 285 may extend the repeated pattern to the erased area to make the same the texture of an entire floor surface F0.

Figure 19:
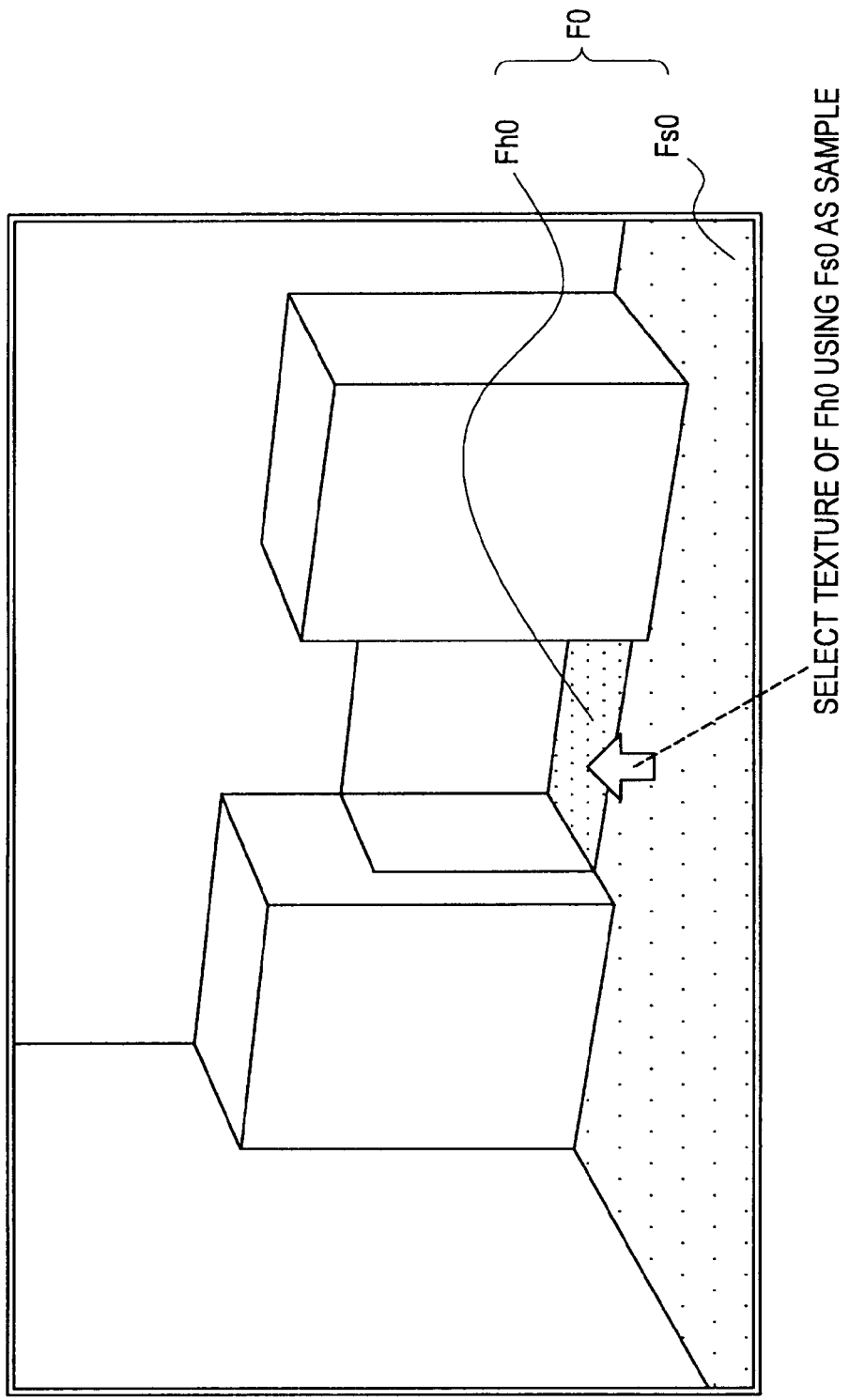
FIG. 19 is an illustrative diagram for illustrating a texture selection process according to the second embodiment.

FIG. 19 is an illustrative diagram for illustrating a texture selection process by the texture selecting unit 285 according to this embodiment. With reference to FIG. 19, the floor surface F0 is divided into two areas of Fh0 and Fs0. Out of them, the area Fh0 is an area included in the erased area determined by the erased area determining unit 186. That is, since the erasing target object is shown in the area Fh0 in the input image, it is not possible to know the texture of the floor surface F0 in the area Fh0 from the input image. On the other hand, the area Fs0 is the area other than the erased area of the floor surface F0, that is, the above-described sample area. Therefore, in the input image, it is estimated that the floor surface F0 is shown in the area Fs0. The texture selecting unit 285 then selects the texture of the floor surface F0 in the area Fh0 according to the average of the pixel value of the pixel belonging to the area Fs0, the repeated pattern of the texture in the area Fs0 or the like, as described above, for example.

Further, the texture selecting unit 285 may select the texture of the wall surfaces W01 and W02 as in the case of the floor surface F0. It should be noted that, the texture selecting unit 285 may allow the user to specify the texture of the floor surface F0 or the wall surface W01 or 02 and select the specified texture in place of the method illustrated with reference to FIG. 19.

[3-3. Summary of Second Embodiment]

According to the image processing device 200 according to this embodiment, the output image obtained by erasing the erasing target object is generated based on the environment map representing the three-dimensional position of the object present in the real space. Herein, the position of the floor surface or the wall surface is estimated based on the position of the point likely to come in contact with the floor surface or the wall surface out of the points on the surface of the object included in the environment map. Also, the texture of the floor surface or the wall surface behind the object to be erased, may be selected according to the image of the area in which the floor surface or the wall surface is estimated to be shown of the input image. Therefore, even in a case in which the wall surface or the floor surface is not included in the environment map, an appropriate output image without the blank space behind the erased object may be generated.

4. Third Embodiment

By applying the method according to the above-described first or second embodiment, it is possible not only to erase an object from the output image but also to virtually move an object. Therefore, in this section, as a third embodiment of the present invention, an example of the configuration of the image processing device capable of moving a specified object out of the objects present in the input image in the output image is described.

Figure 20:
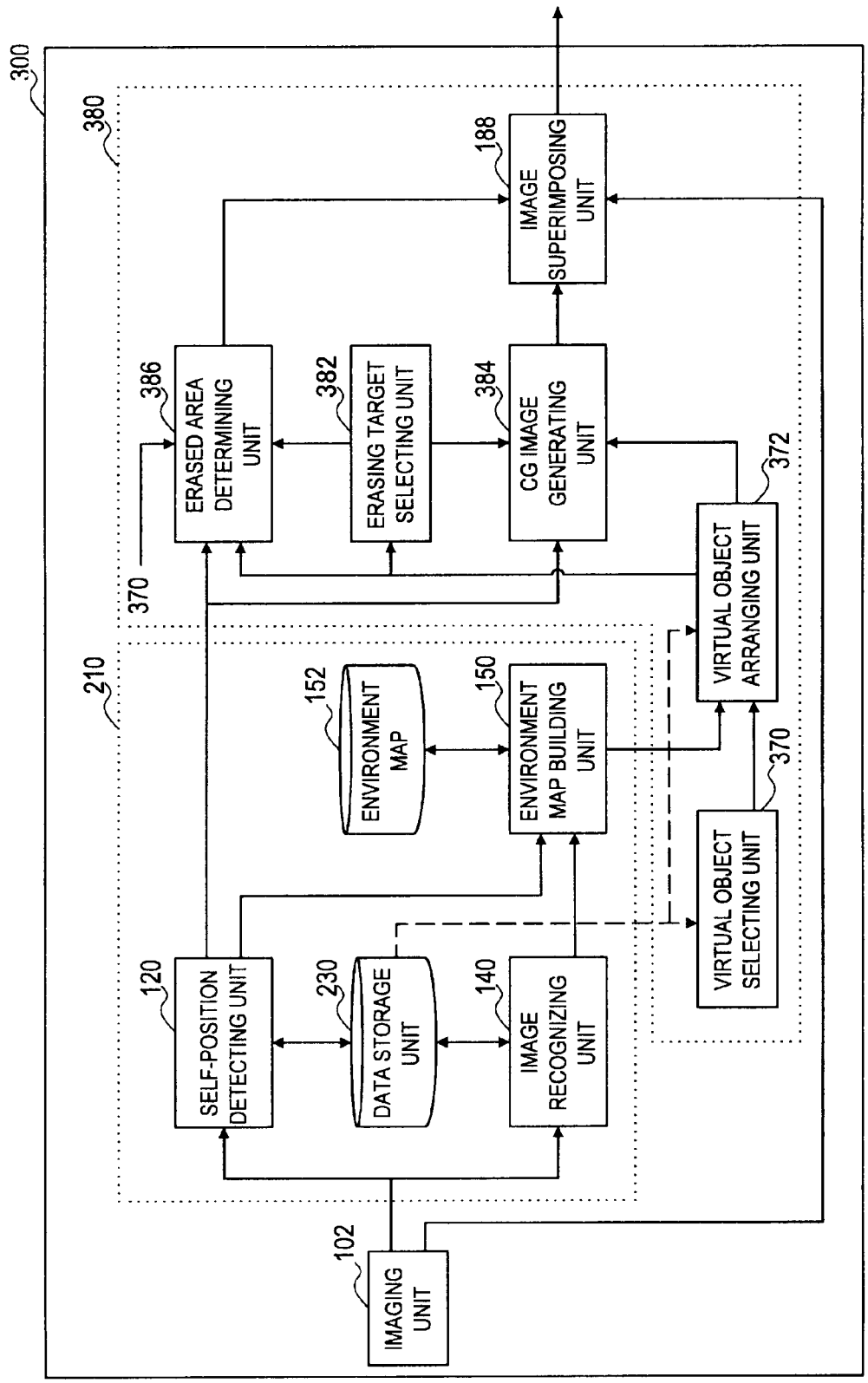
FIG. 20 is a block diagram illustrating an example of the configuration of the image processing device according to a third embodiment.

FIG. 20 is a block diagram illustrating an example of a configuration of an image processing device 300 according to the third embodiment. With reference to FIG. 20, the image processing device 300 includes the imaging unit 102, the environment map generating unit 210 and an output image generating unit 380.

[4-1. Output Image Generating Unit]

As illustrated in FIG. 20, in this embodiment, the output image generating unit 380 includes a virtual object selecting unit 370, a virtual object arranging unit 372, an erasing target selecting unit 382, a CG image generating unit 384, an erased area determining unit 386 and the image superimposing unit 188.

(1) Virtual Object Selecting Unit

The virtual object selecting unit 370 selects an object to be virtually displayed in the output image (hereinafter, referred to as a virtual object). When moving the object, the virtual object is the object substantially identical to the above-described erasing target object. The virtual object selecting unit 370 may display the input image Im01 illustrated in FIG. 2 on a screen of the image processing device 300 to allow the user to specify the object wanted to be moved, for example. Note that, the virtual object selecting unit 370 may display information regarding the object, which is not displayed on the input image, (for example, the object name included in the feature data) on the screen to allow the user to specify the object to be newly displayed (not moved). The virtual object selecting unit 370 outputs an identifier and the like to specify the object selected as the virtual object in this manner to the virtual object arranging unit 372. Further, the virtual object selecting unit 370 outputs a position in the input image specified by the user on the screen as a position on which the virtual object should be arranged to the virtual object arranging unit 372 in relation to the identifier and the like of the virtual object.

(2) Virtual Object Arranging Unit

The virtual object arranging unit 372 determines a three-dimensional position on which the virtual object selected by the virtual object selecting unit 370 should be arranged. For example, the virtual object arranging unit 372 may determine the three-dimensional position on which the virtual object should be arranged according to the position in the input image specified by the user. In this case, two or more three-dimensional positions in the real space may correspond to the position specified in a two-dimensional input image. The virtual object arranging unit 372 then determines one three-dimensional position on which the virtual object should be arranged using the feature data stored in the data storage unit 230.

Figure 21:
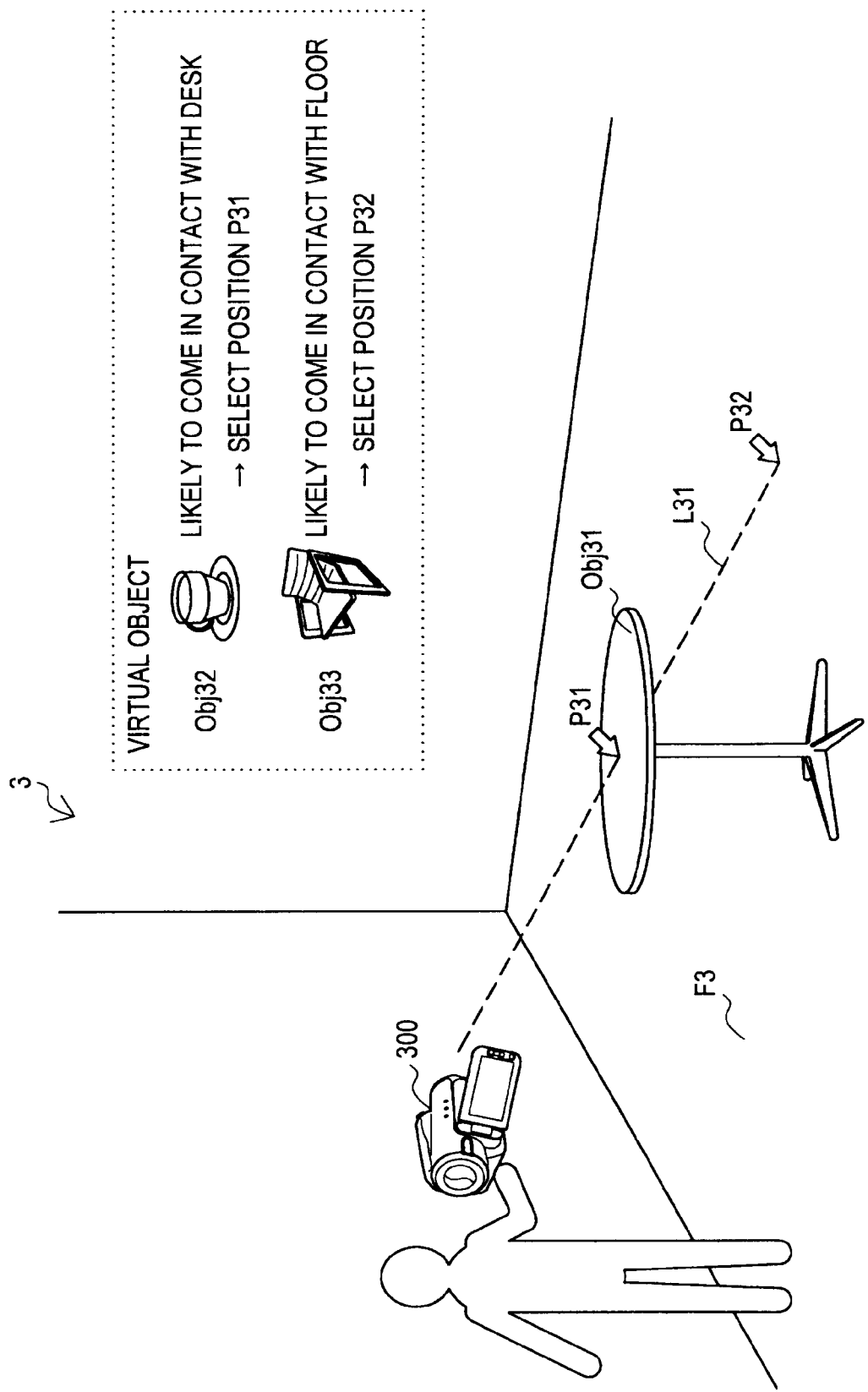
FIG. 21 is an illustrative diagram for illustrating a three-dimensional position selection process according to the third embodiment.

FIG. 21 is an illustrative diagram for illustrating a three-dimensional position determination process by the virtual object arranging unit 372. With reference to FIG. 21, an environment 3 in which the user having the image processing device 300 is present is illustrated. An object Obj31 corresponding to the desk and a floor surface F3 are present inside the environment 3.

Herein, suppose that the user specifies an upper surface of a table (object Obj31) shown in the screen as the position on which the virtual object should be arranged. A dotted line L31 in FIG. 21 represents a set of three-dimensional positions in the environment 3 corresponding to a specified point on a two-dimensional screen. Out of them, a candidate of the position on which the virtual object should be arranged is estimated to be either of a position P31 on the table or a position P32 on the floor surface F3. In this case, the virtual object arranging unit 372 may select the position on which the virtual object should be arranged from the position P31 or the position P32 using the ontology data FD15 illustrated with reference to FIG. 9 or the additional data FD26 illustrated with reference to FIG. 16, for example.

For example, suppose that the selected virtual object is an object Obj32 illustrated in FIG. 21. The object Obj32 corresponds to the coffee cup. Then, it is recognized that the object Obj32 is likely to come in contact with the desk from the ontology data included in the feature data. The virtual object arranging unit 372 then selects the position P31 as the three-dimensional position on which the virtual object Obj32 should be arranged.

Also, suppose that the selected virtual object is an object Obj33 illustrated in FIG. 21, for example. The object Obj33 corresponds to the chair. Then, it is recognized that the object Obj33 is likely to come in contact with the floor from the ontology data or the additional data included in the feature data. The virtual object arranging unit 372 then selects the position P32 as the three-dimensional position on which the virtual object Obj33 should be arranged.

When the virtual object arranging unit 372 determines the three-dimensional position on which the virtual object should be arranged (and direction of the virtual object as necessary) in this manner, this adds the virtual object selected by the virtual object selecting unit 370 to the three-dimensional position of the environment map obtained from the environment map building unit 150. The virtual object arranging unit 372 then outputs the environment map to which the virtual object is added to the erasing target selecting unit 382, the CG image generating unit 384 and the erased area determining unit 386.

(3) Erasing Target Selecting Unit

When moving the object, the erasing target selecting unit 382 selects the object identical to the virtual object included in the environment map before adding the virtual object as the erasing target object. The erasing target selecting unit 382 then outputs an erasing target identifier to specify the erasing target object to the CG image generating unit 384 and the erased area determining unit 386. Note that, in the environment map, the erasing target identifier is the identifier different from the identifier of the virtual object added by the virtual object arranging unit 372. More specifically, the identifier of the virtual object specifies the object after being moved and the erasing target identifier specifies the object before being moved.

(4) CG Image Generating Unit

The CG image generating unit 384 generates the CG image to be superimposed on the input image, in which the virtual object selected by the virtual object selecting unit 370 is additionally arranged.

More specifically, the CG image generating unit 384 obtains the environment map to which the virtual object is added from the virtual object arranging unit 372. Also, the CG image generating unit 384 obtains the latest position and posture of the camera from the self-position detecting unit 120. The CG image generating unit 384 then generates the CG image in which the object other than the erasing target object (including the virtual object) is visualized based on the three-dimensional position of the object other than the erasing target object represented by the latest environment map and the position and the posture of the camera.

Figure 22:
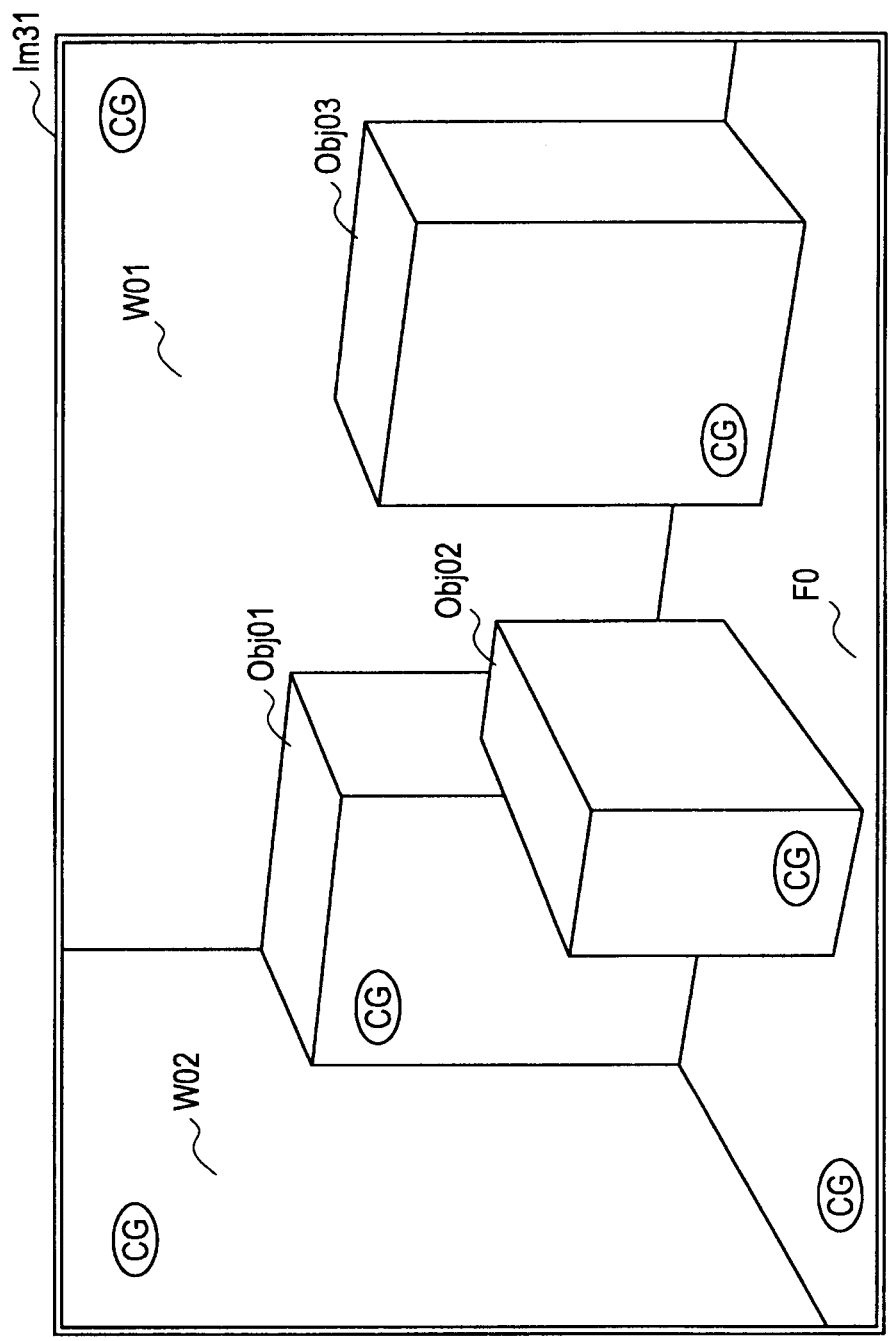
FIG. 22 is an illustrative diagram for illustrating an example of the CG image generated by the CG image generating unit according to the third embodiment.

FIG. 22 is an illustrative diagram for illustrating an example of the CG image generated by the CG image generating unit 384. With reference to FIG. 22, a CG image Im31 as an example generated by the CG image generating unit 384 is illustrated. Note that, it is herein supposed that the object Obj02 out of the objects present in the environment 1 illustrated in FIG. 1 is selected as the object to be moved.

As is understood from FIG. 22, the objects Obj01 and Obj03, the wall surfaces W01 and W02 and the floor surface F0 out of the objects present in the environment 1 are included in the CG image Im31. Further, the CG image Im31 also includes the selected virtual object, that is, the object Obj02 after being moved. The CG image generating unit 384 may generate such CG image Im31 using the equation (11) according to the pinhole model, for example, based on the three-dimensional position of each object represented by the environment map to which the virtual object is added and the position and the posture of the camera. The CG image generating unit 384 then outputs the generated CG image to the image superimposing unit 188.

(5) Erased Area Determining Unit

The erased area determining unit 386 determines the erased area, which is the area in the input image corresponding to the virtual object and the erasing target object.

More specifically, the erased area determining unit 386 obtains the environment map to which the virtual object is added from the virtual object arranging unit 372. Also, the erased area determining unit 386 obtains the latest position of the camera from the self-position detecting unit 120. The erased area determining unit 386 then specifies the object in the environment map located the nearest to the camera on the straight line passing from the focal point of the camera through each pixel, for example. Herein, when the specified object is the virtual object or the erasing target object, it is determined that the pixel belongs to the erased area. On the other hand, when the specified object is not the virtual object or the erasing target object (or when there is no object in the environment map on the straight line), it is determined that the pixel does not belong to the erased area.

Figure 23:
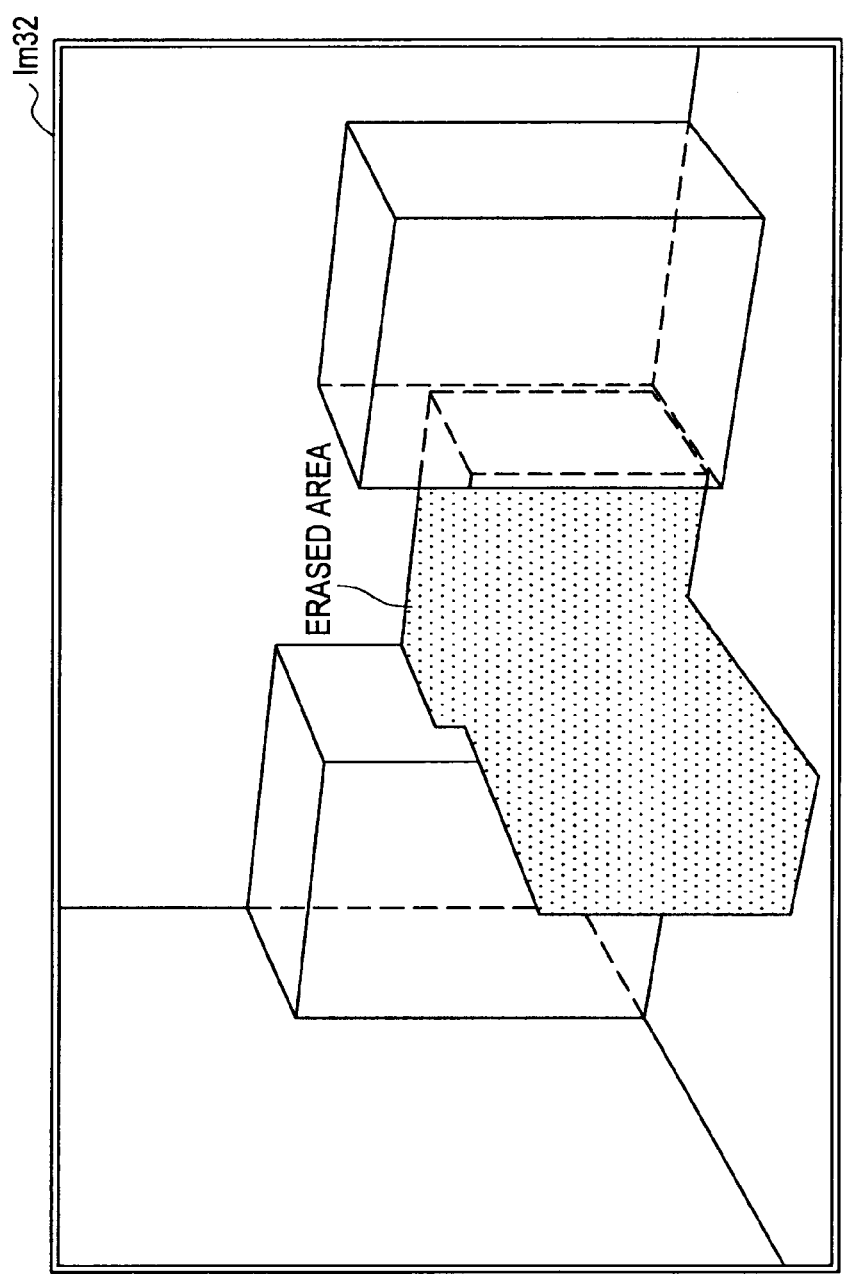
FIG. 23 is an illustrative diagram for illustrating an example of the erased area determined by the erased area determining unit according to the third embodiment.

FIG. 23 is an illustrative diagram for illustrating an example of the erased area determined by the erased area determining unit 386. With reference to FIG. 23, the erased area in a case in which the object Obj02 is made the object to be moved, in the input image Im01 illustrated in FIG. 2 is illustrated in an image Im32 by being masked. The erased area determining unit 386 determines, for each pixel, whether the pixel belongs to the erased area in this manner, and outputs the result to the image superimposing unit 188.

(6) Image Superimposing Unit

Figure 24:
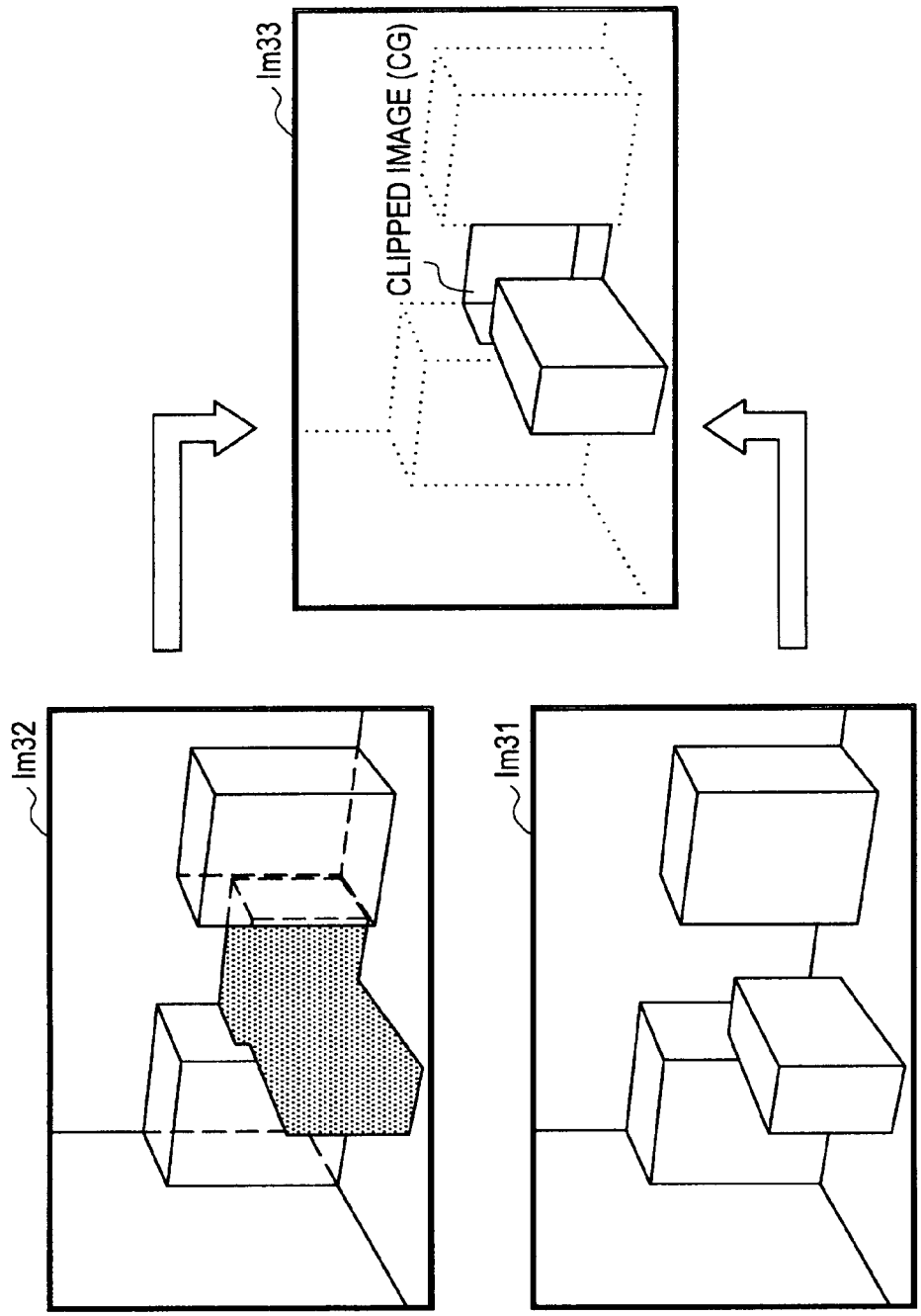
FIG. 24 is a first illustrative diagram for illustrating the superimposition of the CG image on the input image according to the third embodiment.
Figure 25:
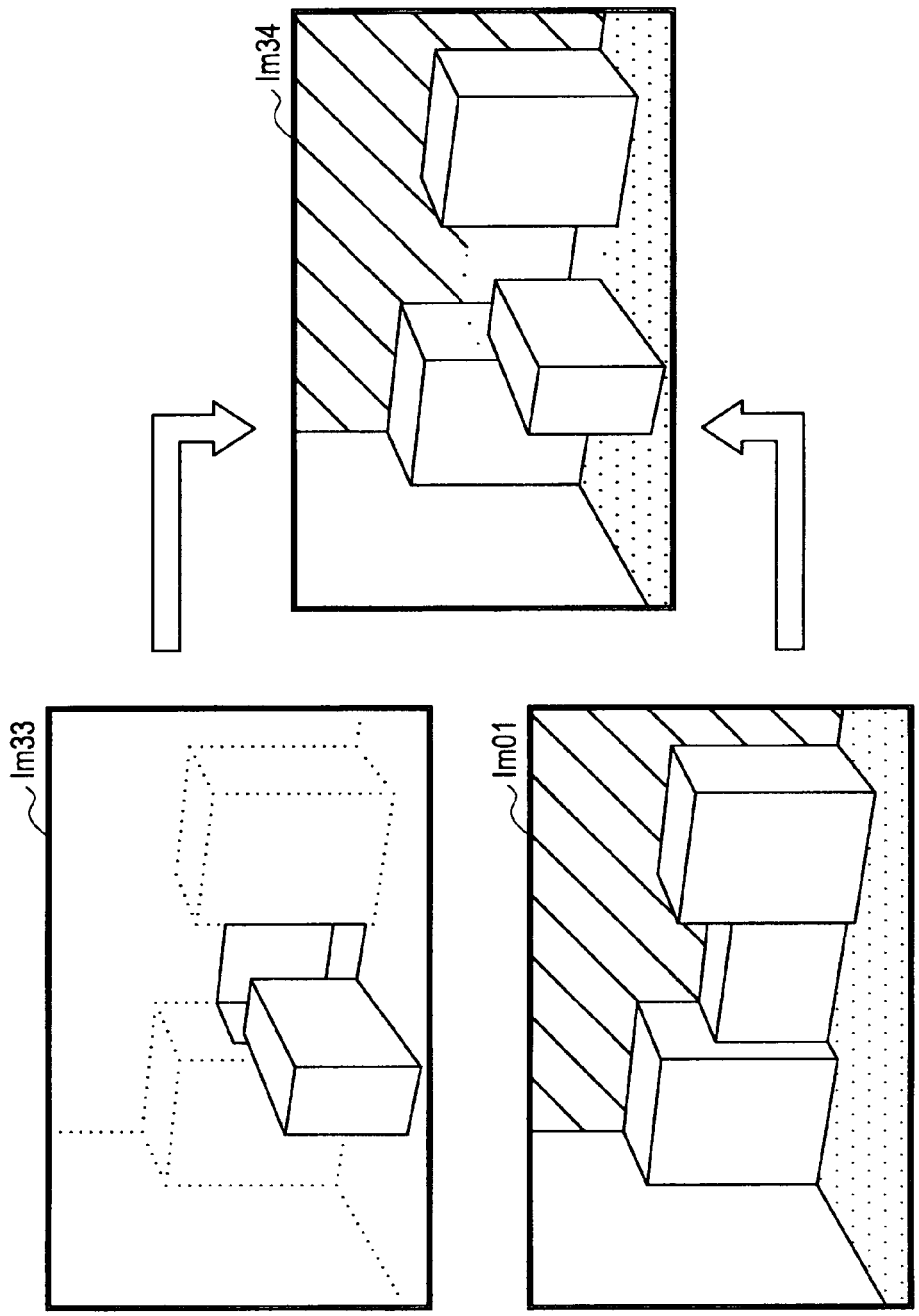
FIG. 25 is a second illustrative diagram for illustrating the superimposition of the CG image on the input image according to the third embodiment.

FIGS. 24 and 25 are illustrative diagrams for illustrating superimposition of the CG image on the input image by the image superimposing unit 188 in this embodiment.

The image Im32 representing the erased area as an example determined by the erased area determining unit 386 is illustrated in an upper left part of FIG. 24. Also, the CG image Im31 as an example generated by the CG image generating unit 384 is illustrated in a lower left part of FIG. 24. The image superimposing unit 188 generates a clipped image obtained by clipping only a part corresponding to the erased area from such CG image Im31. An image Im33 including the clipped image, which is the CG image, is illustrated in a right part of FIG. 24.

Next, the image Im33 including the clipped image illustrated with reference to FIG. 24 is illustrated in an upper left part of FIG. 25. Also, the input image Im01 as an example input from the imaging unit 102 is illustrated in a lower left part of FIG. 25. The image superimposing unit 188 generates an output image Im34 by superimposing the clipped image on such input image Im01. The output image Im34 in which the part corresponding to the erased area of the input image Im01 is replaced with the CG image is illustrated in a right part of FIG. 25.

The image superimposing unit 188 then outputs the output image Im34 generated in this manner to the screen (or another functional unit as necessary) of the image processing device 300 as a result of the process by the image processing device 300.

[4-2. Summary of Third Embodiment]

According to the image processing device 300 according to this embodiment, a virtual object selected by a user, for example, is additionally arranged in the CG image to be superimposed on the input image. Such virtual object may be an object erased from an original position as the erasing target object, for example. According to this, it becomes possible not only to erase the object from the output image but also to virtually move the object.

The first to third embodiments of the present invention are described so far with reference to FIGS. 1 to 25. According to the embodiments, it becomes possible to erase the specified object from the image or to virtually move the same without taking the background image in advance. Such method is useful indoors when designing rearranging of the furniture, for example. Also, this is considered to be useful outdoors in a scene of erasing other advertising signs in order to give stronger impression of a specific advertising sign for specific advertisement to users or of erasing a building in front of a road to guide a user for the road.

5. Hardware Configuration

Note that, it does not matter whether a series of processes according to the above-described first to third embodiments are realized by the hardware or software. When a series of processes or a part of the same is executed by the software, a program composing the software is executed using a computer incorporated in dedicated hardware or a general-purpose computer illustrated in FIG. 26, for example.

In FIG. 26, a central processing unit (CPU) 902 controls entire operation of the general-purpose computer. A program or data in which a part of or an entire of the series of processes is described is stored in a read only memory (ROM) 904. The program and data used by the CPU 902 when executing the process are temporarily stored in a random access memory (RAM) 906.

The CPU 902, the ROM 904 and the RAM 906 are connected to each other through a bus 910. An input/output interface 912 is further connected to the bus 910.

The input/output interface 912 is the interface to connect the CPU 902, the ROM 904 and the RAM 906, and an input device 920, a display device 922, a storage device 924, an imaging device 926 and a drive 930.

The input device 920 accepts instruction from the user and information input through an input interface such as a button, a switch, a lever, a mouse and a keyboard, for example. The display device 922 is composed of a cathode ray tube (CRT), a liquid crystal display, an organic light emitting diode (OLED) and the like, for example, and displays the image on a screen thereof.

The storage device 924 is composed of a hard disk drive or the semiconductor memory, for example, and stores the program and the data. The imaging device 926 corresponds to the hardware of the above-described imaging unit 102 and images the real space using the imaging element such as the CCD or the CMOS. The drive 930 is provided on the general-purpose computer as necessary, and removable media 932 is mounted on the driver 930, for example.

When executing the series of processes according to the first to third embodiments by the software, the program stored in the ROM 904, the storage device 924 or the removable media 932 illustrated in FIG. 26 is read into the RAM 906 and executed by the CPU 902, for example.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-246090 filed in the Japan Patent Office on Oct. 27, 2009, the entire content of which is hereby incorporated by reference.

What is claimed is:

1. An image processing device, comprising:
   circuitry configured to
      store feature data indicating a feature of appearance of an object,
      generate an environment map representing a position of one or more objects existing in a real space based on an input image obtained by imaging the real space using an imaging device and on the stored feature data, and
      generate an output image by erasing an erasing target object from the input image based on a position of the erasing target object being one of the one or more objects existing in the real space recorded in the input image and represented in the environment map, and based on a position of the imaging device,
   wherein the erasing target object is an object recorded by the imaging device in the imaging of the real space at a time of the imaging of the real space, and
   wherein the circuitry is further configured to estimate a position of a floor surface or a wall surface in the real space based on a position of a point on a surface of an object other than the erasing target object represented by the environment map, and generate a CG image based on the position of the floor surface or the wall surface in the estimated real space.

2. The image processing device according to claim 1, wherein the circuitry is further configured to dynamically detect the position of the imaging device based on the input image and the feature data.

3. The image processing device according to claim 2, wherein the circuitry is further configured to:

determine an erased area being an area in the input image corresponding to the erasing target object based on the position of the erasing target object in the environment map and the position of the imaging device, and generate the output image by superimposing the CG image that is generated, on the input image for at least a part of the erased area.

4. The image processing device according to claim 3, wherein the circuitry is further configured to generate the CG image further based on a position of the object other than the erasing target object represented by the environment map and the position of the imaging device.

5. The image processing device according to claim 4, wherein the feature data includes data indicating, for one or more points on the surface of each object, whether each point is likely to come in contact with the floor surface or the wall surface in the real space, and the circuitry is further configured to estimate the position of the floor surface or the wall surface in the real space further based on the feature data.

6. The image processing device according to claim 4, wherein the circuitry is further configured to generate the CG image of a portion included in the erased area and the portion in which the floor surface or the wall surface in the real space should be shown according to an image of a portion in which the floor surface or the wall surface in the real space is estimated to be shown of the input image.

7. The image processing device according to claim 3, wherein the circuitry is further configured to select an object to be virtually displayed in the output image, and wherein the circuitry is further configured to additionally arrange the selected object in the CG image.

8. The image processing device according to claim 7, wherein the object to be virtually displayed, corresponds to a specified object after being moved out of the objects present in the input image and the erasing target object corresponds to the specified object before being moved.

9. The image processing device according to claim 1, wherein the erasing target object is physically present in the real space.

10. The image processing device according to claim 1, wherein the erasing target object is physically located in the real space between two objects of the one or more objects.

11. An image processing method performed using an image processing device having a memory storing feature data indicating a feature of appearance of an object, the method comprising steps of:

generating an environment map representing a position of one or more objects existing in a real space based on an input image obtained by imaging the real space using an imaging device and on the feature data stored in the memory;

generating an output image obtained by erasing an erasing target object from the input image based on a position in the environment map of the erasing target object being one of the one or more objects existing in the real space recorded in the input image, and based on a position of the imaging device, the erasing target object being an object recorded by the imaging device in the imaging of the real space at a time of the imaging of the real space;

estimating a position of a floor surface or a wall surface in the real space based on a position of a point on a surface of an object other than the erasing target object represented by the environment map; and generating a CG image based on the position of the floor surface or the wall surface in the estimated real space.

12. A non-transitory computer readable medium having stored thereon a program that when executed by a computer causes the computer to perform a method, the method comprising:

storing feature data indicating a feature of appearance of an object;

generating unit for generating an environment map representing a position of one or more objects existing in a real space based on an input image obtained by imaging the real space using an imaging device and on the feature data stored;

generating an output image obtained by erasing an erasing target object from the input image based on a position of the erasing target object being one of the one or more objects existing in the real space recorded in the input image represented in the environment map, and based on a position of the imaging device, the erasing target object being an object recorded by the imaging device in the imaging of the real space at a time of the imaging of the real space;

estimating a position of a floor surface or a wall surface in the real space based on a position of a point on a surface of an object other than the erasing target object represented by the environment map; and generating a CG image based on the position of the floor surface or the wall surface in the estimated real space.

* * * * *